United States Patent
Takaoka et al.

(10) Patent No.: US 10,651,468 B2
(45) Date of Patent: May 12, 2020

(54) NONAQUEOUS ELECTROLYTE SECONDARY BATTERY, AND POSITIVE ELECTRODE OF NONAQUEOUS ELECTROLYTE SECONDARY BATTERY

(71) Applicant: KANEKA CORPORATION, Osaka-shi (JP)

(72) Inventors: Ayumi Takaoka, Settu (JP); Masato Kuratsu, Settu (JP)

(73) Assignee: KANEKA CORPORATION, Osaka-shi (JP)

( * ) Notice: Subject to any disclaimer, the term of this patent is extended or adjusted under 35 U.S.C. 154(b) by 355 days.

(21) Appl. No.: 15/550,119

(22) PCT Filed: Feb. 5, 2016

(86) PCT No.: PCT/JP2016/053536
§ 371 (c)(1),
(2) Date: Aug. 10, 2017

(87) PCT Pub. No.: WO2016/129527
PCT Pub. Date: Aug. 18, 2016

(65) Prior Publication Data
US 2018/0034053 A1 Feb. 1, 2018

(30) Foreign Application Priority Data
Feb. 12, 2015 (JP) ................. 2015-025579

(51) Int. Cl.
*H01M 4/525* (2010.01)
*H01M 4/131* (2010.01)
(Continued)

(52) U.S. Cl.
CPC .......... *H01M 4/525* (2013.01); *H01M 4/131* (2013.01); *H01M 4/36* (2013.01); *H01M 4/48* (2013.01);
(Continued)

(58) Field of Classification Search
CPC ...... H01M 4/525; H01M 4/505; H01M 4/485; H01M 4/131; H01M 4/1391; H01M 4/364;
(Continued)

(56) References Cited

U.S. PATENT DOCUMENTS

| | | | |
|---|---|---|---|
| 6,534,216 B1* | 3/2003 | Narukawa ......... | C01G 45/1242 29/623.1 |
| 6,818,351 B2* | 11/2004 | Sunagawa ......... | C01G 45/1242 429/224 |

(Continued)

FOREIGN PATENT DOCUMENTS

| | | |
|---|---|---|
| EP | 1 193 782 A2 | 4/2002 |
| EP | 1 953 851 A1 | 8/2008 |

(Continued)

OTHER PUBLICATIONS

International Preliminary Report on Patentability and Written Opinion dated Aug. 15, 2017 in PCT/JP2016/053536 (submitting English language translation only).
(Continued)

*Primary Examiner* — Stephen J Yanchuk
(74) *Attorney, Agent, or Firm* — Oblon, McClelland, Maier & Neustadt, L.L.P.

(57) ABSTRACT

The present invention provides a nonaqueous electrolyte secondary battery characterized by a significantly smaller amount of gas formation and excellent cycle stability exhibited during cycle testing even when a titanium compound is used for a negative electrode.
A nonaqueous electrolyte secondary battery is structured to have a casing, encapsulating a positive electrode, nonaqueous electrolyte, and a negative electrode facing the positive electrode across a separator. The negative electrode contains a titanium compound as a negative-electrode active material, the separator is electrically insulative,
(Continued)

the positive electrode contains a spinel-type lithium manganese oxide and a layered rock salt structure compound as positive-electrode active materials, the spinel-type lithium manganese oxide is set to have a number average particle size of 10 μm to 20 μm, and a specific surface area of 0.05 m$^2$/g to 0.4 m$^2$/g, the content of the layered rock salt structure compound is set to be 2 to 5 parts by weight per 100 parts by weight of the spinel-type lithium manganese oxide, and the layered rock salt structure compound is set to have a number average particle size of 3 μm to 9 μm, and a specific surface area of 0.3 m$^2$/g to 0.6 m$^2$/g.

20 Claims, 2 Drawing Sheets

(51) Int. Cl.
*H01M 4/485* (2010.01)
*H01M 4/505* (2010.01)
*H01M 10/0525* (2010.01)
*H01M 10/0566* (2010.01)
*H01M 4/36* (2006.01)
*H01M 4/48* (2010.01)

(52) U.S. Cl.
CPC ........... *H01M 4/485* (2013.01); *H01M 4/505* (2013.01); *H01M 10/0525* (2013.01); *H01M 10/0566* (2013.01)

(58) Field of Classification Search
CPC ............... H01M 4/04; H01M 10/0525; H01M 10/0566; H01M 2300/0082; C01G 45/1242; C01G 51/42; C01G 53/42; C01P 2004/61; C01P 2004/80; C01P 2006/40
See application file for complete search history.

(56) References Cited

U.S. PATENT DOCUMENTS

| 2002/0061443 | A1 | 5/2002 | Nakanishi et al. | |
| 2007/0048597 | A1* | 3/2007 | Ryu | H01M 4/131 429/66 |
| 2008/0070119 | A1 | 3/2008 | Miura et al. | |
| 2009/0139787 | A1 | 6/2009 | Ohsawa et al. | |
| 2013/0320256 | A1 | 12/2013 | Kim et al. | |
| 2015/0147652 | A1* | 5/2015 | Shibamura | H01M 4/485 429/223 |
| 2015/0207148 | A1* | 7/2015 | Kimura | H01M 4/622 429/199 |

FOREIGN PATENT DOCUMENTS

| JP | 2000-215884 A | 8/2000 |
| JP | 2008-98142 A | 4/2008 |
| JP | 2010-153258 A | 7/2010 |
| JP | 2013-51202 A | 3/2013 |
| JP | 2015/107832 A1 | 7/2015 |
| WO | 03/081698 A1 | 10/2003 |
| WO | WO 2007/021087 A1 | 2/2007 |
| WO | 2012/023501 A1 | 2/2012 |

OTHER PUBLICATIONS

Supplementary European Search Report dated May 25, 2018 in Patent Application No. 16749171, 2 pages.
Kitao, H. et al. "High-Temperature Storage Performance of Li-Ion Batteries Using a Mixture of Li—Mn Spinel and Li—Ni—Co—Mn Oxide as a Positive Electrode Material", Electrochemical and Solid-State Letters, vol. 8, No. 2, XP055027517, 2005, pp. A87-A90.
International Search Report dated May 10, 2016 in PCT/JP2016/053536 filed Feb. 5, 2016.

* cited by examiner

NONAQUEOUS ELECTROLYTE SECONDARY BATTERY, AND POSITIVE ELECTRODE OF NONAQUEOUS ELECTROLYTE SECONDARY BATTERY

FIELD OF THE INVENTION

The present invention relates to a nonaqueous electrolyte secondary battery, and to a positive electrode of a nonaqueous electrolyte secondary battery.

DESCRIPTION OF BACKGROUND ART

Research and development on nonaqueous electrolyte secondary batteries for use in applications such as mobile phones, hybrid or electric vehicles and home storage systems has been widely carried out in recent years.

Nonaqueous electrolyte secondary batteries used in such applications are required to meet high safety standards and have a long lifetime.

Among nonaqueous electrolyte secondary batteries, lithium-ion secondary batteries have attracted considerable attention for satisfying such high requirements. Especially on the rise is the development of lithium-ion secondary batteries structured to have a spinel-type lithium manganese oxide as a positive-electrode active material and a titanium compound as a negative-electrode active material.

However, lithium-ion secondary batteries using a titanium compound as a negative-electrode active material may cause a reaction gas to be formed when the electrolyte reacts with the negative-electrode active material during charging or the like. Such a reaction gas blocks migration of lithium ions between electrodes, thus lowering the cycle stability.

Considering the aforementioned problems, Patent Literature 1 proposes a secondary battery formed by using a spinel-type lithium manganese oxide for the positive electrode, to which lithium cobalt oxide is added.

According to the battery of Patent Literature 1, formation of gas in the battery is suppressed because of a lithium composite oxide having a layered crystal structure added to a spinel-type lithium manganese oxide.

Moreover, Patent Literatures 2~4 are publications also related to the present invention.

CITATION LIST

Patent Literature

Patent Literature 1: JP2000-215884A
Patent Literature 2: JP2013-051202A
Patent Literature 3: WO2012/023501
Patent Literature 4: WO2003/081698

DISCLOSURE OF THE INVENTION

Problems to be Solved by the Invention

According to Patent Literature 1, lithium cobalt oxide needs to be added at a content of at least 5 wt. % of all of the active materials.

However, as shown in Patent Literature 1, in a mixed positive electrode formed with different positive-electrode active materials, a spinel-type lithium manganese oxide and lithium cobalt oxide are exposed to the same potential environment during charge/discharge cycles. Therefore, if the amount of lithium cobalt oxide is increased relative to the amount of the spinel-type lithium manganese oxide as shown in Patent Literature 1, materials such as lithium cobalt oxide and lithium nickel oxide may deteriorate before the spinel-type lithium manganese oxide does. As a result, a mixed positive electrode prepared using different positive-electrode active materials may cause a decrease in the capacity retention rate in long-term cycle testing, and further improvement is necessary.

Accordingly, the objective of the present invention is to provide a nonaqueous electrolyte secondary battery structured to have a spinel-type lithium manganese oxide as a positive-electrode active material, a titanium compound as a negative-electrode active material, and a layered rock salt compound added to the positive-electrode active materials so that the battery is capable of suppressing gas formation and enhancing cycle characteristics relative to those of conventional batteries.

Solutions to the Problems

Considering the aforementioned problems, the inventors of the present invention have carried out intensive studies and found that by setting the amount of layered rock salt compounds relative to a spinel-type lithium manganese oxide to be within a predetermined range, and by setting the number-average particle size and the specific surface area of each of both materials to be within a predetermined range, the obtained battery is capable of suppressing the formation of gas caused between reactions of the electrolyte and electrodes and exhibiting stability in cycle characteristics.

Namely, in a system structured to have a spinel lithium manganese oxide and a layered rock salt structure compound as the positive-electrode active materials and a titanium compound as the negative-electrode active material, the inventors of the present invention used a smaller amount of layered rock salt structure compound than that in Patent Literature 1 while specifying the number-average particle size and the specific surface area of the layered rock salt structure compound so as to maintain excellent cycle characteristics. By so doing, the inventors aimed to enhance the effect of suppressing the formation of gas so that gas reduction and excellent cycle characteristics are both achieved.

However, simply setting the amount of a layered rock salt structure compound while specifying its number-average particle size and specific surface area was not sufficient to achieve both gas reduction and excellent cycle characteristics. Therefore, the inventors focused their attention on the ratio of a spinel-type lithium manganese oxide and layered rock-salt compound as the third factor and carried out further studies. As a result, the inventors have found the effect of suppressing the formation of gas and showing excellent cycle characteristics is only achievable when (1)~(3) below satisfy specified ranges, and that if any of (1)~(3) deviates from its specified range, either gas reduction or excellent cycle characteristics are not achieved.

(1) the amount of a layered rock salt structure compound to be added;
(2) the number-average particle size and specific surface area of a spinel-type lithium manganese oxide; and
(3) the number-average particle size and specific surface area of the layered rock salt structure compound.

An aspect of the present invention based on the above findings is a nonaqueous electrolyte secondary battery, structured to have a casing which encapsulates a positive electrode, an electrolyte, and a negative electrode facing the positive electrode across a separator. The negative electrode contains a titanium compound as its active material, the separator is electrically insulative, and the positive electrode contains a spinel-type lithium manganese oxide and a layered rock salt structure compound as its active materials. The spinel-type lithium manganese oxide has a number average particle size of 10 µm to 20 µm and a specific surface area of 0.05 $m^2/g$ to 0.4 $m^2/g$; the layered rock-salt compound is contained at 2 to 5 parts by weight per 100 parts by weight of the spinel-type lithium manganese oxide; and the layered rock salt structure compound has a number average particle size of 3 µm to 9 µm and a specific surface area of 0.3 $m^2/g$ to 0.6 $m^2/g$.

In the above, a "number average particle size" means the number average particle size of secondary particles formed by agglomeration of primary particles. When no secondary particles exist, a number average particle size means that of the primary particles. When particles are spherical, the particle size indicates its diameter, and for those that are not spherical, the particle size is obtained by measuring the maximum side of each particle using an electron microscope such as a scanning electron microscope (SEM) and transmission electron microscope (TEM) and by calculating the average size of the observed particles. The same definition applies to the rest of the present application.

To calculate a number average particle size, it is preferred to observe and measure the size of 50 random particles by using an electron microscope such as an SEM. To obtain an even more accurate size, it is preferred to pick at random 100 particles or more for measurement.

A "specific surface area" means the surface area per unit mass, indicating the BET specific surface area based on the measurement results determined by the BET method.

According to the above aspect, because the battery is structured to have a spinel-type lithium manganese oxide as the positive-electrode active material and a titanium compound as the negative-electrode active material, it is a highly safe and long-lasting.

Moreover, according to the present aspect, when the negative electrode is formed by using a titanium compound as the negative-electrode active material, and the positive electrode is a mixed positive electrode prepared by using a spinel-type lithium manganese oxide as the positive-electrode active material, to which a layered rock-salt compound such as lithium cobalt oxide is added to suppress the formation of gas, the amount of gas formation during cycle testing is significantly reduced for a long duration, not only at an early stage but at a later stage of the test.

Namely, according to the present aspect, the battery is capable of maintaining a long-term effect of suppressing the formation of gas by a layered rock salt compound while keeping the cycle characteristics of the entire battery from lowering caused by deterioration of the layered rock salt structure compound.

Although it is not clear why the above-mentioned battery has a long-term effect of significantly suppressing the formation of gas during cycle testing, not only at an early stage but also at a later stage of the test (hereinafter also referred to as a long-term gas reduction effect), the mechanism can be described as follows.

First, at an early stage of a cycle test, it is thought that hydrogen gas tends to be formed when the electrolyte is decomposed at an abnormal activity site of a titanium compound used as the negative-electrode active material. Then, a certain amount of hydrogen gas is thought to be occluded in a layered rock salt structure compound contained as a positive-electrode active material.

Moreover, when the battery is repeatedly charged/discharged such as in cycle testing, a solid-electrolyte interphase (SEI) film is formed over a period of time on the surface of an abnormal activity site of the titanium compound as the negative-electrode active material. As the negative-electrode abnormal activity site is coated with the SEI film, the formation of hydrogen gas at the negative-electrode abnormal activity site seems to taper off.

Next, at a later stage of the cycle test, an abnormal activity site is formed in the positive-electrode active material mainly due to the deterioration of the material. Then, the electrolyte tends to form carbon dioxide when decomposed at the positive-electrode abnormal activity site.

The following is a study of how the formation of a gas would be affected by the amount of, the number-average particle size, and the specific surface area of each of the positive electrode active materials.

First, to sufficiently occlude hydrogen gas formed at a negative-electrode abnormal activity site at an early stage of cycle testing, it is necessary to add a certain amount of a layered rock salt compound. However, the amount of a layered rock salt structure compound needs to be limited to a certain level, since an excessive amount may increase the number of positive-electrode abnormal activity sites.

In general, a spinel-type lithium manganese oxide seldom deteriorates, since it does not expand/contract significantly when lithium ions are inserted or extracted. Namely, a positive-electrode abnormal activity site is less likely to be formed in a spinel-type lithium manganese oxide.

By contrast, a layered rock salt structure compound expands/contracts when hydrogen ions and lithium ions are inserted (occluded) or extracted, and tends to deteriorate. Namely, a positive-electrode abnormal activity site is more likely to be formed in a layered rock salt structure compound.

Based on the above, the positive electrode in the present aspect is set to contain 2 to 5 parts by weight of a layered rock salt structure compound, which tends to cause formation of a positive-electrode abnormal activity site, per 100 parts by weight of a spinel-type lithium manganese oxide, which tends not to cause formation of a positive-electrode abnormal activity site. In other words, the amount of a layered rock salt structure compound added to the positive electrode is set smaller than that in conventional batteries.

To sufficiently exhibit the effect of occluding hydrogen gas by using a smaller amount of layered rock salt structure compound, it is necessary to reduce the number average particle size of the layered rock salt compound and to increase its specific surface area.

For that purpose, the present aspect employs a layered rock salt structure compound having a smaller number average particle size and a greater specific surface area so as to suppress negative impacts derived from hydrogen gas.

When a positive electrode with an optimum setting as above was combined with a negative electrode containing a titanium compound, negative impacts caused by the presence of gas were eliminated at an early stage of cycle testing, and a high performance battery was achieved.

However, at a later stage of cycle testing, more gas was formed than forecast under certain conditions, affecting the performance of the battery.

During the study, the above phenomenon was found to be more notable in a cycle test conducted by using a layered rock salt compound having an even smaller number-average particle size and an even greater specific surface area. A negative impact was also observed in a cycle test conducted by using a layered rock salt structure compound having a greater number average particle size and a smaller specific surface area than the above settings.

Reasons for the first case are assumed as follows: when cycles are repeated on the layered rock salt structure compound, the ratio of regions having a disturbed layered structure of particle surfaces increases relative to regions having an aligned layered structure inside particles, and such a hike in the ratio increases the number of positive-electrode abnormal activity sites that cause formation of carbon dioxide, resulting in greater formation of gas.

Considering the above, to suppress negative impacts caused by formation of carbon dioxide, a layered rock salt compound used in the present aspect is set to have a number-average particle size of 3 μm or greater and a specific surface area of 0.6 m$^2$/g or smaller.

Reasons for the latter case are assumed as follows: when the number-average particle size of a layered rock salt structure compound is set to be a certain level or greater, cracking may occur during repeated cycles, causing the same negative impact as that in the first case conducted using a layered rock salt structure compound with a smaller number average particle size.

Accordingly, to suppress negative impacts caused by the formation of carbon dioxide, a layered rock salt compound in the present aspect is set to have a number average particle size of 9 μm or smaller and a specific surface area of 0.3 m$^2$/g or greater.

Furthermore, to eliminate negative impacts derived from the presence of hydrogen gas and carbon dioxide, the inventors have found it necessary to adjust parameters, such as particle size, of a spinel-type lithium manganese oxide relative to those of a layered rock salt compound.

More specifically, the inventors have found that a spinel-type lithium manganese oxide needs to have a number-average particle size of 10 to 20 μm and a specific surface area of 0.05 to 0.4 m$^2$/g; that is, its particle size needs to be 1.1 to 6.7 times the particle size of a layered rock salt structure compound.

In addition, even if a spinel-type lithium manganese oxide is thought to have excellent stability, a positive-electrode abnormal activity site may still be formed in a portion adjacent to where a layered rock-salt compound expands/contracts.

Therefore, to prevent formation of a positive-electrode abnormal activity site in portions where a spinel-type lithium manganese oxide is adjacent to a layered rock salt structure compound, increasing the particle size of a spinel-type lithium manganese oxide, so as to position smaller particles of the layered rock salt structure compound in spaces made among adjacent larger particles of spinel-type lithium manganese oxide, is thought to be effective.

Such a setting enables particles of the layered rock salt structure compound to expand/contract without affecting particles of the spinel-type lithium manganese oxide.

Also, to enhance battery performance through sufficient electrode reactions and diffusion of lithium ions in the positive electrode, particles of spinel-type lithium manganese oxide to having a certain specific surface area it is thought to be effective.

In addition, a layered rock salt compound with a certain amount of occluded hydrogen gas is relatively stable, and its expansion/contraction rates decrease as its stability is enhanced when hydrogen gas is occluded. Accordingly, after a certain number of cycles, it is thought that positive-electrode abnormal activity sites are less likely to be formed.

Based on the study above, it is thought that the amount of hydrogen gas that contributes to stabilization of a layered rock salt structure compound and all the hydrogen gas formed in an early stage of cycle testing are well balanced in the present aspect, leading to a long-term effect of suppressing the formation of gas.

To summarize the above study, a layered rock salt compound with a number-average particle size of 3 to 9 μm in the present aspect is capable of occluding a predetermined level of hydrogen gas during charge/discharge cycles, and reducing the formation of carbon dioxide. Moreover, the number-average particle size of a spinel-type lithium manganese oxide corresponding to the above particle size is 10 to 20 μm, which does not cause formation of carbon dioxide. Accordingly, the battery characteristics is at a certain level or higher. Moreover, since the amount of a layered rock salt compound to be added is 2 to 5 parts by weight, all the hydrogen gas is substantially occluded in an early stage of cycle testing, and the battery performance is less likely to be negatively affected.

In a preferred aspect, the spinel-type lithium manganese oxide is at least one type selected from among $Li_{1+x}Al_yMn_{2-x-y}O_4$ (0≤x≤0.1, 0<y≤0.1) and $Li_{1+x}Mg_yMn_{2-x-y}O_4$ (0≤x≤0.1, 0<y≤0.1).

In a preferred aspect, when the capacitance per unit area of the positive electrode is referred to as (A) and the capacitance per unit area of the negative electrode as (B), the ratio (B/A) of their capacitance values satisfies formula (1) below.

$$0.8 \leq B/A \leq 1.3 \tag{1}$$

In a more preferred aspect, the capacitance of the negative electrode relative to that of the positive electrode is set to have a ratio (B/A) of 1.0 or greater.

In a preferred aspect, the positive electrode has a positive-electrode active-material layer spread in a planar shape, and the negative electrode has a negative-electrode active-material layer spread in a planar shape; when the separator-side surface area of the plane of the positive-electrode active-material layer is referred to as (C) and the separator-side surface area of the plane of the negative-electrode active-material layer as (D), the plane area ratio (D/C) satisfies formula (2) below.

$$0.8 \leq D/C \leq 1.2 \tag{2}$$

In a more preferred aspect, the separator-side surface area of the plane of the negative-electrode active-material layer relative to the separator-side surface area of the plane of the positive-electrode active-material layer is set to have a ratio (D/C) of 1.0 or greater.

In the above aspect, the positive electrode is preferred to have a layer containing a positive-electrode active material with area (C) facing the negative electrode.

In the above aspect, the negative electrode is preferred to have a layer containing a negative-electrode active material with area (D) facing the positive electrode.

In a preferred aspect, the titanium compound is at least one type selected from among $Li_4Ti_5O_{12}$, $H_2Ti_{12}O_{25}$, and $TiO_2(B)$.

In a preferred aspect, the layered rock-salt compound is at least one type selected from among lithium cobalt oxide, lithium nickel cobalt aluminum oxide and lithium nickel cobalt manganese oxide.

In a preferred aspect, the layered rock-salt compound has a number-average particle size of 5 μm to 7 μm, and a specific surface area of 0.4 m$^2$/g to 0.5 m$^2$/g.

In a preferred aspect, the nonaqueous electrolyte secondary battery is structured to have multiple secondary cells each formed by sandwiching the separator between the positive and negative electrodes, and the adjacent secondary cells are electrically connected parallel.

Another aspect of the present invention is a nonaqueous electrolyte secondary battery structured to have a casing encapsulating a positive electrode, nonaqueous electrolyte and a negative electrode, in which the negative electrode faces the positive electrode across a separator; the negative electrode contains a titanium compound as a negative-electrode active material; the titanium compound is at least one type selected from among $Li_4Ti_5O_{12}$, $H_2Ti_{12}O_{25}$ and $TiO_2(B)$; the separator is electrically insulative; the positive electrode contains a spinel-type lithium manganese oxide and a layered rock-salt compound as positive-electrode active materials; the spinel-type lithium manganese oxide has a number-average particle size of 10 μm to 20 μm, and a specific surface area of 0.05 m$^2$/g to 0.4 m$^2$/g; the spinel-type lithium manganese oxide is at least one type selected from among $Li_{1-x}Al_yMn_{2-x-y}O_4$ (0≤x≤0.1, 0<y≤0.1) and $Li_{1+x}Mg_yMn_{2-x-y}O_4$ (0≤x≤0.1, 0<y≤0.1); the layered rock-salt compound is contained at 2 to 5 parts by weight per 100 parts by weight of the spinel-type lithium manganese oxide; the layered rock-salt compound has a number-average particle size of 3 μm to 9 μm, and a specific surface area of 0.3 m$^2$/g to 0.6 m$^2$/g; and the layered rock salt structure compound is at least one type selected from among lithium cobalt oxide, lithium nickel cobalt aluminum oxide and lithium nickel cobalt manganese oxide.

According to the aspect above, since a spinel-type lithium manganese oxide is used as a positive-electrode active material, the obtained battery meets high safety standards and has a long lifetime.

In addition, according to the present aspect, even when a secondary battery is formed using a titanium compound as a negative-electrode active material, the battery is capable of expressing a long-term effect of suppressing the formation of gas. Accordingly, the amount of gas is significantly reduced for a long duration, from an early stage through a later stage of cycle testing.

Yet another aspect of the present invention is a positive electrode of a nonaqueous electrolyte secondary battery structured to contain a spinel-type lithium manganese oxide and a layered rock salt structure compound as positive-electrode active materials; the layered rock salt structure compound is contained at 2 to 5 parts by weight per 100 parts by weight of the spinel-type lithium manganese oxide; the spinel-type lithium manganese oxide has a number average particle size of 10 μm to 20 μm and a specific surface area of 0.05 m$^2$/g to 0.4 m$^2$/g; and the layered rock salt compound has a number-average particle size of 3 μm to 9 μm and a specific surface area of 0.3 m$^2$/g to 0.6 m$^2$/g.

According to the aspect above, since a spinel-type lithium manganese oxide is used as a positive-electrode active material, the obtained battery meets high safety standards and has a long lifetime.

In addition, according to the present aspect, even when a secondary battery is formed using a titanium compound as a negative-electrode active material, the battery is capable of expressing a long-term effect of suppressing the formation of gas. Accordingly, the amount of gas is significantly reduced for a long duration, from an early stage through a later stage of cycle testing.

Effects of the Invention

A secondary battery provided according to the present invention is capable of significantly suppressing the formation of gas for a long duration from an early stage through a later stage of cycle testing while exhibiting excellent cycle stability.

MODE TO CARRY OUT THE PRESENT INVENTION

An embodiment of the present invention is described as follows. However, the present invention is not limited to the description below.

Figure 1:
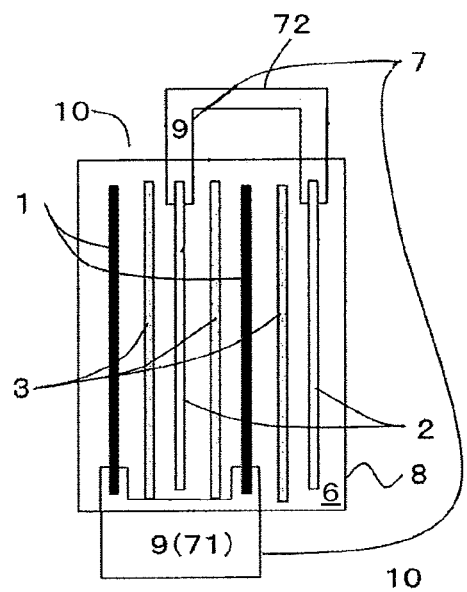
FIG. 1 is a cross-sectional view schematically showing a nonaqueous electrolyte secondary battery according to an embodiment of the present invention.
Figure 3:
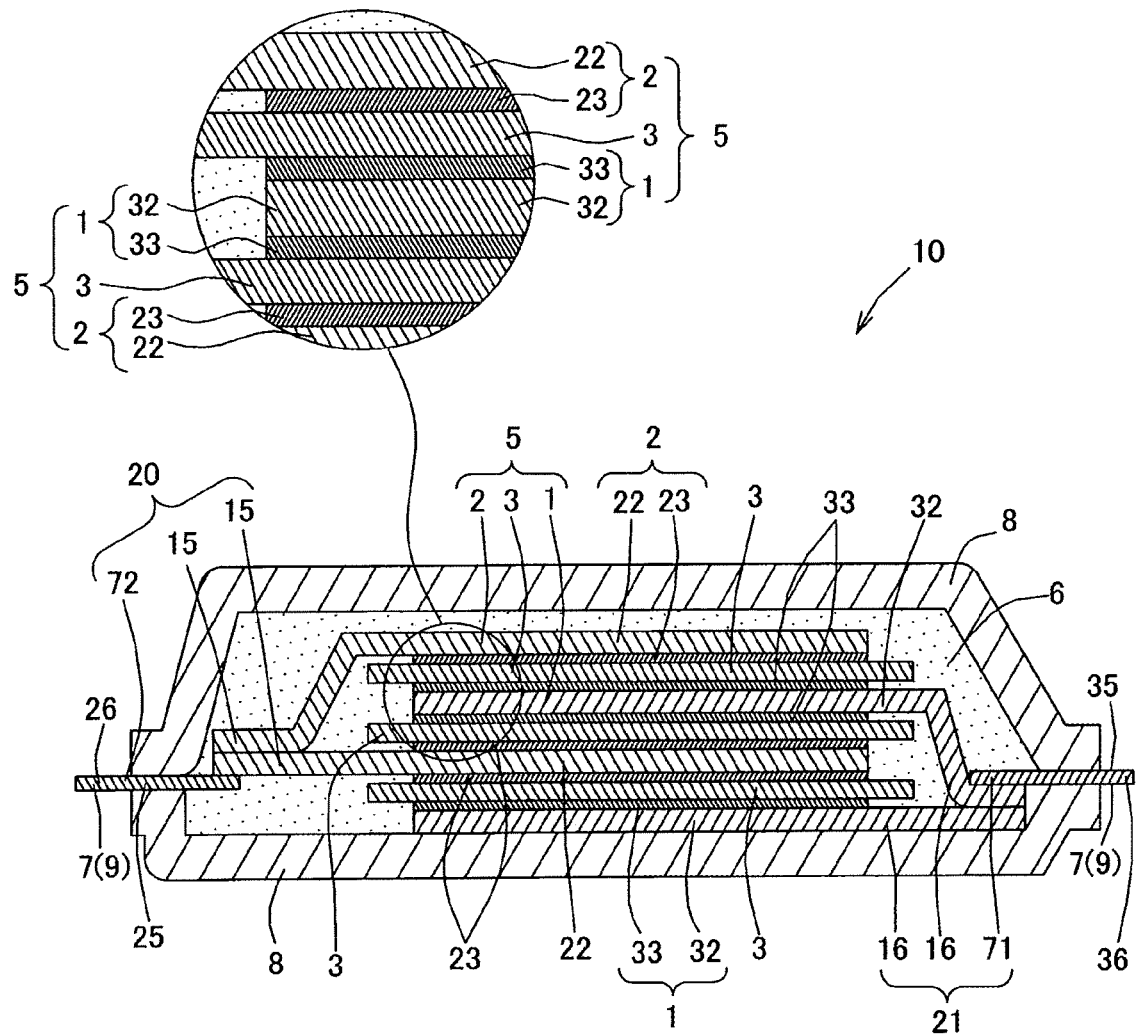
FIG. 3 is a cross-sectional view of the nonaqueous electrolyte secondary battery shown in FIG. 2.

As shown in FIGS. 1 and 3, nonaqueous electrolyte secondary battery 10 according to an embodiment of the present invention is structured to have casing 8 which encapsulates positive electrode 2, nonaqueous electrolyte 6, negative electrode 1, and separator 3, which is made of an electrically insulative material and sandwiched between positive and negative electrodes (2, 1). In casing 8, nonaqueous electrolyte 6 for carrying lithium ion conduction is present at least on the surfaces of positive electrode 2, negative electrode 1 and separator 3.

As shown in FIG. 3, nonaqueous electrolyte secondary battery 10 of the present embodiment is structured to have multiple negative electrodes 1 and multiple positive electrodes 2 encapsulated in casing 8. Separator 3 is disposed between positive electrode 2 and negative electrode 1.

In addition, terminals 7 are electrically connected to positive electrode 2 and negative electrode 1 respectively.

Terminals 7 electrically connected to positive and negative electrodes (2, 1) include extended terminal portions 9 protruding at least to the outside of casing 8. Namely, extended terminal portions 9 of terminals 7 protrude from inside casing 8 of nonaqueous electrolyte secondary battery 10.

In other words, as shown in FIG. 1, part of negative terminal 71 connected to each negative electrode 1 and part of positive terminal 72 connected to each positive electrode 2 extend to the outside of nonaqueous electrolyte secondary battery 10.

As shown in FIG. 1, nonaqueous electrolyte secondary battery 10 is formed by stacking multiple secondary cells 5, each of which is a stack of positive electrode 2/separator 3/negative electrode 1 or negative electrode 1/separator 3/positive electrode 2, and by adding other necessary parts to the stacks so as to form a group of electrodes. More specifically, positive electrode 2/separator 3/negative electrode 1/negative electrode 1/separator 3/positive electrode 2/positive electrode 2/separator 3/negative electrode 1 are stacked in that order to form a group of electrodes, which is then encapsulated in a package such as laminate film. Nonaqueous electrolyte secondary battery 10 is preferred to have the package as its main body.

Alternatively, secondary cells 5 may be rolled, and other necessary parts and the like are added to form a group of electrodes, which is then encapsulated in a package such as laminate film to form casing 8. Nonaqueous electrolyte secondary battery 10 is preferred to have casing 8 as its main body.

In the above, as shown in FIG. 3, positive and negative electrodes (2, 1) are portions where active-material layers (23, 33) containing active materials that contribute to electrode reactions are formed on current collectors (22, 32).

What is formed by connecting positive electrode 2 or negative electrode 1 to positive terminal 72 or negative terminal 71 may also be referred to as positive-electrode member 20 or negative-electrode member 21.

Namely, positive electrode 2 indicates a portion where positive-electrode active-material layer 23 containing at least a positive-electrode active material is formed on current collector 22; and negative electrode 1 indicates a portion where negative-electrode active-material layer 33 containing at least a negative-electrode active material is formed on current collector 32.

The following provides a further detailed description of nonaqueous electrolyte secondary battery 10 according to a first embodiment of the present invention.

Figure 2:
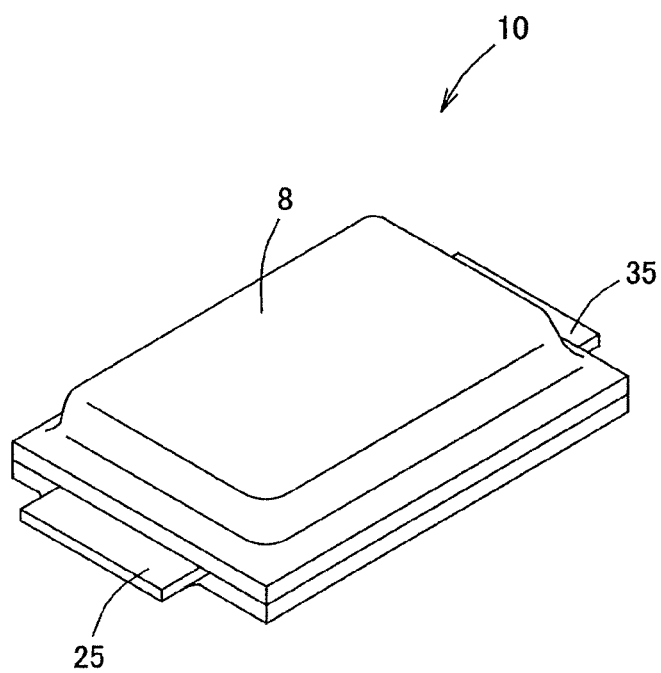
FIG. 2 is a perspective view schematically showing a nonaqueous electrolyte secondary battery according to a first embodiment of the present invention.

As shown in FIGS. 2 and 3, nonaqueous electrolyte secondary battery 10 of the first embodiment is a laminate-type lithium-ion secondary battery.

In nonaqueous electrolyte secondary battery 10, multiple secondary cells 5 are built into casing 8; that is, multiple secondary cells 5, each being a stack of negative electrode 1, separator 3 and positive electrode 2, are layered and encapsulated in casing 8 to form nonaqueous electrolyte secondary battery 10 as shown in FIG. 3.

More specifically, positive-electrode member 20/separator 3/negative-electrode member 21/separator 3/positive-electrode member 20/separator 3/negative-electrode member 21 are stacked in that order in nonaqueous electrolyte secondary battery 10. Namely, positive electrode 2/separator 3/negative electrode 1/negative electrode 1/separator 3/positive electrode 2/positive electrode 2/separator 3/negative electrode 1 are laminated in that order in nonaqueous electrolyte secondary battery 10.

Secondary cell 5 is structured by sandwiching separator 3 between positive electrode 2 of positive-electrode member 20 and negative electrode 1 of negative-electrode member 21.

Moreover, nonaqueous electrolyte 6 is filled in casing 8 of nonaqueous electrolyte secondary battery 10 as shown in FIG. 3, and at least active-material portions of electrodes (1, 2) in electrode members (21, 20) of each secondary cell 5 are impregnated with nonaqueous electrolyte 6.

<Positive-Electrode Member and Negative-Electrode Member>

As shown in FIG. 3, positive-electrode member 20 and negative-electrode member 21 are respectively formed with multiple electrode-forming members (15, 16), and conductive terminals (72, 71) are connected to end portions of electrode-forming members (15, 16).

Electrode-forming members (15, 16) are obtained when active-material layers (23, 33) containing active materials of electrodes (2, 1) are formed on conductive current collectors (22, 32).

Current collectors (22, 32) of electrode-forming members (15, 16) and terminals (72, 71) may be set as separate members, or current collectors (22, 32) and terminals (72, 71) may be respectively incorporated into one entities.

Positive-electrode member 20 of the present embodiment includes multiple positive-electrode-forming members 15, where positive-electrode active-material layer 23 is formed on part of either surface or both surfaces of current collector 22 spread in a planar shape. Namely, positive-electrode-forming member 15 is structured to have positive electrode 2 on part of either or both of its surfaces.

Positive-electrode-forming members 15 are connected to each other at their end portions. One end portion of current collector 22 of one positive-electrode-forming member 15 is connected to positive-electrode terminal 72, which is a different member from current collector 22.

Negative-electrode member 21 of the present embodiment includes multiple negative-electrode-forming members 16 formed by forming negative-electrode active-material layer 33 on part of either surface or both surfaces of current collector 32 spread in a planar shape. Namely, negative-electrode-forming member 16 is structured to have negative electrode 1 on part of either or both of its surfaces.

Negative-electrode-forming members 16 are connected to each other at their end portions. One end portion of current collector 32 of one negative-electrode-forming member 16 is connected to negative-electrode terminal 71, which is a different member from current collector 32.

Namely, in secondary cell 5, positive electrodes 2 positioned adjacent to each other in a lamination direction are set to be equipotential and are electrically connected in parallel. The same applies to negative electrodes 1.

In each of positive electrodes 2 and negative electrodes 1, the ratio of maximum area/minimum area, indicating variations in the area of each outer surface that contributes to electrode reactions, is preferred to be 1 to 1.3. Namely, in each of positive electrodes 2 and negative electrodes 1, surfaces of active-material layers (23, 33) positioned not to face current collectors (22, 32) are exposed to nonaqueous electrolyte 6 in casing 8 (such surfaces are referred to as electrode reactive surfaces in the present application), and such outer surfaces are preferred to have a maximum area/minimum area ratio of 1 to 1.3. In other words, positive electrode 20 and negative electrode 21 facing each other across separator 3 are each preferred to have an electrode reactive surface with a ratio of 1 to 1.3 for the maximum area relative to the minimum area.

Furthermore, in secondary battery 10, electrode reactive surfaces of positive electrodes 2 are preferred to be substantially the same size, and the same applies to negative electrodes 1.

Here, "substantially the same size" means the difference between the maximum and minimum values is no greater than 1% of the maximum value; that is, "the ratio of maximum area relative to the minimum area is substantially the same" means the difference between the minimum area and maximum area is no greater than 1% of the maximum area.

Such a range contributes to enhancing uniform reactions at electrodes (2, 1), thus making a highly reliable yet compact battery 10. The area of each electrode reactive surface in positive and negative electrodes (2, 1) is controlled, for example, by adjusting the coating width of slurry when active-material layers (23, 33) are formed on current collectors (22, 32), Regarding positive and negative electrodes (20, 21), at least active-material layers (23, 33), current collectors (22, 32) and portions of terminals (72, 71) are encapsulated in casing 8.

The rest of terminals (72, 71) protrude from casing 8, and portions protruding from casing 8 are set to be extended portions (26, 36). In other words, extended terminal portions (26, 36) of terminals (25, 35) are exposed outside casing 8.

Extended terminal portions (26, 36) are electrically connectible with external devices and used for charge/discharge of the battery.

Namely, in secondary battery 10, part of positive-electrode member 20 is encapsulated in casing 8 with the rest protruding from casing 8 as positive-electrode extended terminal portion 26, enabling electrical connection with external devices. In the same manner, part of negative-electrode member 21 is encapsulated in casing 8 with the rest protruding from casing 8 as negative-electrode terminal extended portion 36, enabling electrical connection with external devices.

In the present embodiment, extended terminal portion 26 electrically connected to positive-electrode member 20 and extended terminal portion 36 electrically connected to negative-electrode member 21 extend in opposite directions from each other.

Moreover, regarding the capacity per each unit area of positive electrodes 2 and of negative electrodes 1, the ratio of maximum capacity/minimum capacity per unit area, which indicates variations in capacity per each unit area among electrodes, is preferred to be 1 to 1.3.

The ratio of maximum capacity per unit area relative to the minimum capacity per unit area in positive electrodes 2 is preferred to be 1 to 1.3. Also, the ratio of maximum capacity per unit area relative to the minimum capacity per unit area in negative electrodes 1 is preferred to be 1 to 1.3.

In secondary battery 10, the capacity per unit area is preferred to be substantially the same in positive electrodes 2 as well as in negative electrodes 1.

Such a setting contributes to enhancing uniform reactions at electrodes, thus making a battery that is highly reliable yet compact.

The capacity per unit area of positive and negative electrodes (2, 1) is controlled by adjusting the weight per unit area when active-material layers (23, 33) are formed on current collectors (22, 32) respectively. Also, the capacity per unit area of positive and negative electrodes (2, 1) is controlled by adjusting the thickness during a coating process of active-material layers.

Furthermore, when the capacity per unit area of each positive electrode 2 is set substantially the same while setting the capacity per unit area of each negative electrode 1 to be substantially the same, and when the capacity per unit area of positive electrode 2 is referred to as (A) and the capacity per unit area of negative electrode 1 as (B), the capacity ratio (B/A) is preferred to satisfy formula (1) below from the viewpoint of achieving a highly reliable battery by balancing reactions at positive and negative electrodes (2, 1).

$$0.8 \leq B/A \leq 1.3 \tag{1}$$

When the capacity ratio (B/A) is lower than 0.8 between negative and positive electrodes (1, 2) facing each other across separator 3, the capacity of negative electrode 1 may dip significantly compared with that of positive electrode 2. Thus, when overcharged, negative electrode 1 may reach the lithium deposition potential, and may cause short circuiting in the battery.

On the other hand, when the capacitance ratio (B/A) exceeds 1.3 between negative and positive electrodes (1, 2) facing each other across separator 3, excessive side reactions may occur in a negative-electrode active material not involved in electrode reactions, causing unwanted gas formation in casing 8 derived from such side reactions.

Furthermore, the capacitance ratio (B/A) is more preferred to be 1.0 or greater, that is, to satisfy formula (1') below.

$$1.0 \leq B/A \leq 1.3 \tag{1'}$$

By setting the above range, the capacity of positive electrode 2 is smaller than that of negative electrode 1 to a certain degree, and a change in voltage during charge/discharge cycles is controlled by a change in potential of positive electrode 2, that is, the battery is set to be under positive electrode regulation.

A battery under positive electrode regulation allows a minimal setting for the amount of positive-electrode active material that may form a positive-electrode abnormal activity site to cause formation of carbon dioxide at a later stage of cycle testing.

Here, formation of carbon dioxide at a later stage of cycle testing may have a serious impact on the battery in the long run compared with the impact of hydrogen gas which is formed at an early stage of cycle testing but occluded substantially entirely in the layered rock-salt active material that forms part of active-material layer 23 of positive electrode 2.

Moreover, the area of each electrode reactive surface of positive electrodes 2, as well as that of negative electrodes 1, is set to be substantially the same size, while the capacity per unit area of each positive electrode 2, as well as that of each negative electrode 1, is set to be substantially the same. Under such conditions, regarding area (C) of positive-electrode active-material layer 23 of positive electrode 2 facing negative electrode 1 across separator 3, and area (D) of negative-electrode active-material layer 33 of negative electrode 1 facing positive electrode 2 across separator 3, the area ratio (D/C) is preferred to satisfy formula (2) below.

Namely, the separator 3-side area (D) of negative-electrode active-material layer 33 relative to the separator 3-side area (C) of positive-electrode active-material layer 23 is preferred to have a ratio (D/C) that satisfies formula (2) below.

$$0.8 \leq D/C \leq 1.2 \tag{2}$$

When the area ratio (D/C) of negative-electrode active-material layer 33 to positive-electrode active-material layer 23 is in the above range, electrode reactions at positive electrode 2 are appropriately balanced with the electrode reactions at negative electrode 1, thus making a highly reliable battery.

When the area ratio (D/C) of negative-electrode active-material layer 33 relative to positive-electrode active-material layer 23 is smaller than 0.8, the capacitance of negative electrode 1 may dip significantly compared with that of positive electrode 2. Thus, when overcharged, the negative electrode 1 may reach the lithium deposition potential, and may cause short circuiting in the battery.

On the other hand, an area ratio (D/C) exceeding 1.2 means negative-electrode active-material layer 33 has a greater portion that does not face positive electrode 2 as its counterpart positioned across separator 3. Thus, in such a bare portion, excessive side reactions of negative-electrode active material not involved in electrode reactions may be triggered, causing unwanted gas formation in casing 8 derived from such side reactions.

Furthermore, the area ratio (D/C) is more preferred to be 1.0 or greater; that is, the area ratio D/C is more preferred to satisfy formula (2') below.

$$1.0 \leq D/C \leq 1.2 \tag{2'}$$

An area ratio (D/C) of 1.0 or greater makes it easier to set the battery under positive electrode regulation. With separator 3 disposed in between, the surface of positive-electrode active-material layer 23 is entirely covered by negative-electrode active-material layer 33 which contains as its main component a titanium compound having excellent properties of suppressing short circuiting, thus even further enhancing the safety of the battery.

To balance between increasing the capacity of battery 10 and enhancing its power density, the capacity per 1 cm$^2$ of each of electrodes (2, 1) is preferred to be 0.5 mAh to 4.0 mAh at the electrode reactive surface.

In positive electrode 2, the capacity per 1 cm$^2$ is preferred to be 3.0 mAh or lower at its electrode reactive surface.

To obtain a battery having a desired capacity, the battery may need to have a larger size if the capacity per 1 cm$^2$ is smaller. On the other hand, to increase the capacity per 1 cm$^2$, the power density tends to decrease.

The capacity per unit area of electrodes 2 and 1 is determined by forming each electrode (2, 1) and preparing a half cell with a lithium metal as its counter electrode, and by analyzing the charge/discharge characteristics of the half cell.

(Positive Electrode)

While charging battery 10, positive electrode 2 works to release lithium ions to nonaqueous electrolyte 6 while supplying electrons through positive terminal 25. In addition, while discharging battery 10, positive electrode 2 works to accept lithium ions from nonaqueous electrolyte 6 while receiving electrons through positive terminal 25. Lithium ions are inserted in/extracted from positive electrode 2 through nonaqueous electrolyte 6.

(Negative Electrode)

While charging battery 10, negative electrode 1 works to accept lithium ions from nonaqueous electrolyte 6 while receiving electrons through negative terminal 35. In addition, while discharging battery 10, negative electrode 1 works to release lithium ions to nonaqueous electrolyte 6 while supplying electrons through negative terminal 35. Lithium ions are inserted in/extracted from negative electrode 1 through nonaqueous electrolyte 6.

<Active-Material Layer>

Active-material layers (23, 33) include at least an active material for each electrode (2, 1). To enhance performance, active-material layers (23, 33) may contain conductive additives and binders in addition to active materials for electrodes (2, 1). It is preferred to prepare positive electrode 2 and negative electrode 1 by respectively using such mixed materials to form active-material layers (23, 33) on current collectors (22, 32).

Namely, positive-electrode active-material layer 23 to form positive electrode 2 contains at least a positive-electrode active material, and may also contain a conductive additive and binder if applicable.

In the same manner, negative-electrode active-material layer 33 to form negative electrode 1 contains at least a negative-electrode active material, and may also contain a conductive additive and binder if applicable.

Active-material layers (23, 33) of the present embodiment are each formed by using a mixture formed by adding a conductive additive and binder to the electrode active material.

Considering the ease of forming active-material layers (23, 33), it is preferred to prepare mixtures by mixing a conductive additive and binder into the active materials of electrodes (2, 1) and to obtain slurries by adding a solvent to the mixtures. Then, the slurries are applied respectively on current collectors (22, 32), which are dried or the like to remove the solvent.

After being formed on current collectors (22, 32), active-material layers (23, 33) are preferred to be compressed to have a desired thickness and density.

Compressing the layers is not limited to a specific method, and may be conducted by using a roll press, a hydraulic press or the like.

The average thickness of active-material layers (23, 33) (when compressed, the average thickness after compression) is preferred to be 10 μm to 200 μm.

If the average thickness of active-material layers (23, 33) is less than 10 μm, it may be difficult to achieve desired capacitance.

On the other hand, if the average thickness of active-material layers (23, 33) exceeds 200 μm, it may be difficult to achieve desired power density.

The density of active-material layers (23, 33) (when compressed, the density after compression) is preferred to be 1.0 g/cm$^3$ to 4.0 g/cm$^3$.

If the density of active-material layers (23, 33) is less than 1.0 g/cm$^3$, it is difficult to make sufficient contact between active materials of electrodes (2, 1) and other components such as current collectors (22, 32) and conductive additives, and the electron conductivity of electrodes (2, 1) is thereby lowered. As a result, the internal resistance may increase in the entire battery 10.

On the other hand, if the density of active-material layers (23, 33) exceeds 4.0 g/cm$^3$, it is difficult for nonaqueous electrolyte 6 to be impregnated into active-material layers (23, 33) of electrodes (2, 1), and lithium ion conductivity is lowered. The internal resistance of battery 10 may also be increased.

Especially, it is more preferred to set the density of active-material layer 23 of positive electrode 2 to be 2.0 g/cm$^3$ or greater by compressing the layer. The density is even more preferred to be 2.2 g/cm$^3$ to 3.5 g/cm$^3$, especially preferably 2.5 g/cm$^3$ to 3.0 g/cm$^3$, to achieve optimal balance.

Meanwhile, it is more preferred to set the density of active-material layer 33 of negative electrode 1 to be 1.5 g/cm$^3$ or greater by compressing the layer. The density is even more preferred to be 1.6 g/cm$^3$ to 2.3 g/cm$^3$, especially preferably 1.8 g/cm$^3$ to 2.2 g/cm$^3$ to achieve optimal balance.

It is not limited to any specific method for forming active-material layers (23, 33) on current collectors (22, 32).

It is preferred to form active-material layers (23, 33) on current collectors (22, 32) by applying the above-prepared slurry by using, for example, a doctor blade, die coater, comma coater or the like, and by removing the solvent; alternatively the layers may be formed by spraying the slurry and by removing the solvent.

The solvent in the slurry is preferred to be removed by drying it in an oven or vacuum oven, considering the ease of procedure.

A solvent may be removed in an air, inert gas or vacuum atmosphere set to be room temperature or higher.

To reduce the time for solvent removal while preventing decomposition of the material in active-material layers (23, 33) and deterioration of the binder, the solvent is preferred to be removed at a temperature of 60° C. to 300° C., more preferably 80° C. to 250° C., even more preferably 230° C. or lower.

Moreover, active-material layers (23, 33) of electrodes (2, 1) may be formed in any order; that is, after active-material layer 33 of negative electrode 1 is formed, active-material layer 23 of positive electrode 2 may be formed, or vice versa.

Forming a slurry is not limited to any specific method.

To homogeneously mix a solvent with a mixture of active material of electrode 2 or 1, a conductive additive and binder, it is preferred to prepare a slurry using a rotation/revolution mixer, ball mill, planetary mixer, jet mill, or thin-film spin mixer.

Considering the ease of procedure, a slurry is preferred to be formed using a rotation/revolution mixer, planetary mixer, or thin-film spin mixer.

In addition, a slurry may be formed by preparing a mixture containing the active material of electrode 2 or 1, a conductive additive and binder and by adding a solvent to the mixture. Alternatively, a slurry may be formed by mixing the above materials and solvent all at once.

The solvent is preferred to be a nonaqueous solvent or water.

A nonaqueous solvent is not limited specifically; examples are N-methyl-2-pyrrolidone (NMP), dimethylformamide, dimethylacetamide, methyl ethyl ketone, methyl acetate, ethyl acetate, tetrahydrofuran and the like. Furthermore, dispersants and thickeners may be added.

Those nonaqueous solvents are preferably volatile solvents.

The solid content of a slurry is preferred to be 30 wt. % to 80 wt. % to have an appropriate viscosity for forming active-material layers (23, 33).

<Active Materials>

As the main component of the positive-electrode active material for forming positive electrode 2, nonaqueous electrolyte secondary battery 10 contains at least two components, that is, a spinel-type lithium manganese oxide and layered rock salt structure active material (layered rock salt structure compound). Also, nonaqueous electrolyte secondary battery 10 contains a titanium compound as the main component of negative-electrode active material for forming negative electrode 1.

Each active material of electrodes (2, 1) is generally supplied as powder.

The bulk density of each active material powder of electrodes (2, 1) is preferred to be 0.2 g/cm$^3$ to 2.2 g/cm$^3$, more preferably no greater than 2.0 g/cm$^3$.

Such a range makes it easier to set an appropriate amount of solvent for preparing a slurry of the aforementioned mixture using an active material powder, and also easier to mix in a conductive additive and binder.

(Positive-Electrode Active Material)

As described above, the positive-electrode active material contains at least two types of main components—a spinel-type lithium manganese oxide and a layered rock salt structure active material (layered rock salt structure compound).

A spinel-type lithium manganese oxide is less likely to expand/contract and tends not to deteriorate in charge/discharge cycles. Accordingly, when a spinel-type lithium manganese oxide is used as the positive-electrode active material, the obtained battery is highly reliable for a long duration and has a long lifetime.

As the positive-electrode active material, a spinel-type lithium manganese oxide is a compound represented by $Li_{1+x}M_yMn_{2-x-y}O_4$ ($0 \leq x \leq 0.2$, $0 < y \leq 0.6$, (M) is an element that belongs to Groups 2~13 and Periods 3 and 4).

(M) in the above chemical formula is at least one element selected from among those belonging to Groups 2~13 and Periods 3 and 4.

(M) in the above chemical formula is preferred to be Al, Mg, Zn, Co, Fe or Cr, more preferably Al, Mg, Zn or Cr, even more preferably Al, Mg or Zn, since such an element is less likely to cause manganese elution or the like, and significantly contributes to enhancing cycle stability.

When (x) is less than zero (x<0) in the above formula, the capacitance of positive-electrode active material tends to decrease.

When (x) is greater than 0.2 (x>0.2), impurities such as lithium carbonate are more likely to be contained. When (y) of the above formula is zero (y=0), the positive-electrode active material tends to have lower stability, whereas when (y) is greater than 0.6 (y>0.6), impurities such as oxides of (M) are more likely to be contained.

Among those listed above, because of its effect of enhancing stability, a spinel-type lithium manganese oxide as the positive-electrode active material is preferred to be one type selected from among $Li_{1+x}Al_yMn_{2-x-y}O_4$ ($0 \leq x \leq 0.1$, $0 < y \leq 0.1$), $Li_{1+x}Mg_yMn_{2-x-y}O_4$ ($0 \leq x \leq 0.1$, $0 < y \leq 0.1$), $Li_{1+x}Zn_yMn_{2-x-y}O_4$ ($0 \leq x \leq 0.1$, $0 < y \leq 0.1$) and $Li_{1+x}Cr_yMn_{2-x-y}O_4$ ($0 \leq x \leq 0.1$, $0 < y \leq 0.1$); more preferably, $Li_{1+x}Al_yMn_{2-x-y}O_4$ ($0 \leq x \leq 0.1$, $0 < y \leq 0.1$) or $Li_{1+x}Mg_yMn_{2-x-y}O_4$ ($0 \leq x \leq 0.1$, $0 < y \leq 0.1$); even more preferably, $Li_{1+x}Al_yMn_{2-x-y}O_4$ ($0 \leq x \leq 0.1$, $0 < y \leq 0.1$).

In addition, it is especially preferable if the above listed $Li_{1+x}Al_yMn_{2-x-y}O_4$ ($0 \leq x \leq 0.1$, $0 < y \leq 0.1$) has a range of (y) set to be $0.03 \leq y \leq 0.1$, since the effect of such a spinel-type lithium manganese oxide as the positive-electrode active material is even greater.

At least one type selected from among $Li_{1+x}Al_yMn_{2-x-y}O_4$ ($0 \leq x \leq 0.1$, $0 < y \leq 0.1$) and $Li_{1+x}Mg_yMn_{2-x-y}O_4$ ($0 \leq x \leq 0.1$, $0 < y \leq 0.1$) is employed for the spinel-type lithium manganese oxide used in the present embodiment.

When its bulk is observed, a powder of spinel-type lithium manganese oxide is preferred to have a number-average particle size of 10 μm to 20 μm to maximize the gas reduction effect, and 15 μm to 20 μm to especially stabilize cycle characteristics.

The specific surface area of a spinel-type lithium manganese oxide powder is preferred to be 0.05 m$^2$/g to 0.4 m$^2$/g to achieve a desired power density, and 0.1 m$^2$/g to 0.3 m$^2$/g to especially stabilize cycle characteristics.

As described above, secondary battery 10 of the present embodiment uses a titanium compound as the negative-electrode active material for forming negative electrode 1.

A layered rock salt structure active material as the positive-electrode active material has a layered rock salt crystal structure, and expresses the effect of suppressing gas formation when a titanium compound is used as the negative-electrode active material.

Although it is not clear how a layered rock salt structure active material suppresses gas formation, a layered rock salt structure active material is capable of occluding gas. Especially, when a layered rock salt active material maintains a charged state, its gas reduction effect is even greater. Namely, a layered rock salt structure active material with a layered rock salt crystal structure is capable of occluding gas formed when nonaqueous electrolyte 6 is decomposed at an abnormal activity site of a titanium compound in the negative electrode, thereby suppressing a decrease in the battery's performance.

However, the layered crystal structure of a layered rock salt structure active material sustains damage as charge/discharge cycles are repeated. As a result, the capacity of positive electrode 2 decreases, and nonaqueous electrolyte 6 decomposes at a positive-electrode abnormal activity site, causing gas to be formed.

Therefore, when it is used in positive electrode 2, the amount of a layered rock salt structure active material per 100 parts by weight of a spinel-type lithium manganese oxide needs to be limited within a certain range.

To express a greater effect of occluding gas by using a smaller amount of layered rock salt structure active material, it is usually thought to be enough if its number-average particle size is decreased while its specific surface area is increased.

However, a layered rock salt structure active material having a smaller number average particle size has a greater ratio of regions having a disturbed layered structure of particle surfaces relative to regions having a stable internal layered structure of particles.

An increase in the ratio of regions having a disturbed layered structure of particle surfaces tends to cause formation of positive-electrode abnormal activity sites, where nonaqueous electrolyte 6 decomposes with a resultant formation of carbon dioxide. Accordingly, the performance of the battery is lowered.

Moreover, a layered rock salt structure active material with a number average particle size greater than a certain size tends to crack after long-term usage, thus ending in the same negative result as that involving a layered rock salt active material with a smaller number-average particle size.

Considering the above, the content of a layered rock salt active material, its number-average particle size, and its specific surface area are set to be within certain ranges in the present embodiment so as to exhibit the targeted capability of occluding hydrogen gas during charge/discharge cycles, to suppress the formation of carbon dioxide, and to maintain a stable state of health of the battery.

In particular, a layered rock salt structure active material is contained at 1 mass % or greater but less than 5 mass % of the entire weight of active materials in positive electrode 2. Specifically, the layered rock salt structure active material is contained at 2 to 5 parts by weight per 100 parts by weight of a spinel-type lithium manganese oxide.

When its external appearance is observed, the number-average particle size of a layered rock-salt active material is set to be 3 μm to 9 μm from the viewpoint of balancing the gas reduction effect and deterioration of the layered rock salt structure active material.

The above observed number average particle size of a layered rock salt structure active material is preferred to be 5 μm to 7 μm, since such a value especially contributes to stabilizing the cycle characteristics.

A number average particle size of smaller than 3 μm causes a greater specific surface area of the particles, thus increasing regions with a disturbed layered structure. Accordingly, the cycle characteristics may be lowered.

Moreover, a number average particle size of greater than 9 μm decreases surface activity sites for occlusion of gas per unit volume, likely making it difficult to sufficiently suppress the formation of gas.

The specific surface area of a layered rock salt structure active material is set to be 0.3 m$^2$/g to 0.6 m$^2$/g to balance the gas reduction effect and deterioration of the layered rock salt structure active material.

The specific surface area of a layered rock salt structure active material is preferred to be 0.4 m$^2$/g to 0.5 m$^2$/g, since cycle characteristics become especially stabilized.

A specific surface area of smaller than 0.3 m$^2$/g results in fewer surface activity sites for occlusion of gas, thus making it hard to sufficiently achieve the gas reduction effect.

A specific surface area of greater than 0.6 m$^2$/g increases regions with a disturbed layered structure, and cycle characteristics may be lowered accordingly.

As for a layered rock salt structure active material, it is not limited specifically as long as it is a layered rock salt structure compound having a layered rock salt crystal structure.

Examples of a layered rock salt structure active material are $LiMeO_2$ (Me is a transition metal) representing lithium nickel composite oxides (such as $LiNiO_2$), lithium cobalt composite oxides ($LiCoO_2$), lithium nickel cobalt composite oxides (such as $LiNi_{1-y}Co_yO_2$), lithium nickel cobalt manganese composite oxides ($LiNi_xCo_yMn_{1-y-z}O_2$, x+y+z=1), solid solutions of $LiMnO_3$, $Li_2MnO_3$ and $Li_xMeO_2$, formed to have excess lithium, and the like.

Because of their greater gas reduction effect, preferred examples of a layered rock salt structure active material are lithium cobalt oxide ($LiCoO_2$), lithium nickel cobalt aluminum oxide ($LiNi_{0.8}Co_{0.15}Al_{0.05}O_2$) and lithium nickel cobalt manganese oxide ($LiNi_xCo_yMn_{1-y-z}O_2$, x+y+z=1); especially preferred is lithium cobalt oxide ($LiCoO_2$).

A use of lithium cobalt oxide ($LiCoO_2$) as the layered rock salt structure active material enhances an effect of occluding hydrogen gas.

Therefore, using lithium cobalt oxide ($LiCoO_2$) allows to have a smaller content of the layered rock salt structure active material in a battery, thus further improving the long-term effect of reducing carbon dioxide. Accordingly, long-term reliability of the battery is enhanced.

As for a layered rock salt structure active material, the compounds listed above may be used alone or in combination thereof.

In the present embodiment, a layered rock salt structure active material is at least one type selected from among lithium cobalt oxide, lithium nickel cobalt aluminum oxide and lithium nickel cobalt manganese oxide.

The surface of a layered rock salt structure active material may be coated with organic substances such as polyethylene glycol, inorganic substances such as aluminum oxide, magnesium oxide, zirconium dioxide and titanium dioxide, and carbon materials.

(Negative-Electrode Active Material)

A titanium compound is the main component of the negative-electrode active material in negative electrode 1.

A "main component" is what determines the characteristics.

Compared with conventional electrode active materials—such as positive-electrode active materials of metal oxides with similar properties, for example, cobalt oxides, and negative-electrode active materials such as carbons—titanium compounds show smaller expansion/contraction rates of active material during insertion/extraction reactions of lithium ions. As a result, nonaqueous electrolyte 6 is less likely to be stirred during expansion/contraction than in a conventional electrode containing a conventional electrode active material as its main component.

Accordingly, to secure at least a certain number of sites for insertion/extraction of lithium ions, a greater specific surface area is necessary in the negative electrode than in a conventional electrode.

Therefore, the specific surface area of negative electrode 1 is preferred to be 1 m$^2$/g to 100 m$^2$/g.

A specific surface area of smaller than 1 m$^2$/g reduces the number of insertion/extraction sites of lithium ions, and a desired capacity may not be achieved.

On the other hand, a specific surface area of greater than 100 m$^2$/g may yield side reactions other than insertion/ extraction of lithium ions, for example, the decomposition of nonaqueous electrolyte 6. Thus, such a range may also fail to achieve a desired capacitance.

It is more preferred to set the specific surface area of 2 m$^2$/g to 50 m$^2$/g in negative electrode 1.

In such a range, the insertion/extraction sites of lithium ions are secured and a desired capacity is achieved, while reducing side reactions other than insertion/extraction of lithium ions.

It is even more preferred to set the specific surface area of 3 m$^2$/g to 30 m$^2$/g in negative electrode 1.

In such a range, progress of side reactions is minimized, and insertion/extraction of lithium ions will be well balanced.

The specific surface area of negative electrode 1 is adjusted by the type and mixing ratios of a negative-electrode active material, conductive additive and binder. Also, the specific surface area of negative electrode 1 may be controlled by compressing the electrode to a desired thickness.

A titanium compound as the negative-electrode active material is contained at a content of more than 50 mass % of the entire active material (main component).

As another negative-electrode active material, elements other than lithium and titanium, for example, niobium, may also be contained at a content of lower than 50 mass %.

The negative-electrode active material is preferred to contain a titanium compound at 80 mass % or greater and another element other than the titanium compound at 20 mass % or less. It is more preferable if a titanium compound is formed to contain a trace amount of elements other than lithium and titanium, for example, niobium.

Preferred examples of a titanium compound are titanic acid compounds, lithium titanate, titanium dioxide and the like. The surface of such a titanium compound may be coated with a carbon material, metal oxide or polymer to enhance its conductivity and to improve its stability.

Preferred examples of a titanic acid compound are $H_2Ti_3O_7$, $H_2Ti_4O_9$, $H_2Ti_5O_{11}$, $H_2Ti_6O_{13}$ and $H_2Ti_{12}O_{25}$, more preferably $H_2Ti_{12}O_{25}$, because it contributes to achieving stability in cycle characteristics.

A lithium titanate is preferred to be a spinel type or a ramsdellite type, preferably a compound represented by a molecular formula of $Li_4Ti_5O_{12}$. When it is a spinel-type compound, expansion/contraction rates are smaller during insertion/extraction reactions of lithium ions.

The titanium dioxide is preferred to be anatase or bronze ($TiO_2(B)$). Since insertion/extraction reactions of lithium ions progress efficiently, a bronze-type titanium dioxide is more preferable. Alternatively, a mixture of anatase and bronze types may also be employed.

A particularly preferable titanium compound is $Li_4Ti_5O_{12}$, since the compound contributes to providing a negative electrode with characteristics such as high safety and excellent stability, thereby achieving excellent safety and stability for the obtained nonaqueous electrolyte secondary battery.

The titanium compound in the present embodiment is at least one type selected from among $Li_4Ti_5O_{12}$, $H_2Ti_{12}O_{25}$ and $TiO_2(B)$.

<Conductive Additives>

Since electron conductivity of active-material layers (23, 33) is low, a conductive additive is added.

The conductive additive in active-material layer 23 of positive electrode 2 is not limited specifically, but a carbon material is preferred considering its cost.

The conductive additive in active-material layer 33 of negative electrode 1 is not limited specifically, and a metallic or carbon material is used.

Examples of carbon material are natural or artificial graphite, gas-phase grown carbon fibers, carbon nanotubes, acetylene black, Ketjenblack, furnace black and the like.

Those carbon materials may be used alone or in combination thereof.

As for the metallic material, it is preferred to use at least one type selected from among copper and nickel.

The amount of a conductive additive contained in active-material layer 23 of positive electrode 2 is preferred to be 1 to 30 parts by weight, more preferably 2 to 10 parts by weight, per 100 parts by weight of the positive-electrode active material.

Per 100 parts by weight of the negative-electrode active material, the amount of conductive additive contained in active-material layer 33 of negative electrode 1 is preferred to be 0.5 to 30 parts by weight, more preferably 1 to 10 parts by weight, to balance output power and energy density.

By setting the above respective ranges, conductivity is secured in positive and negative electrodes (2, 1). Also, conductive additives with such a range can maintain adhesiveness with binders described below, while providing sufficient adhesiveness with current collectors.

<Binders>

Active-material layers (23, 33) are each preferred to contain a binder to bond the active material to current collectors (22, 32).

The type of binder is not limited specifically, but it is preferred to use at least one type selected from among polyvinylidene fluoride (PVdF), polytetrafluoroethylene (PTFE), styrene-butadiene rubber, polyimide and their derivatives.

To balance the bonding strength and energy density, the amount of binder contained in active-material layer 23 of positive electrode 2 is preferred to be 1 to 30 parts by weight, more preferably 2 to 15 parts by weight, per 100 parts by weight of the positive-electrode active material.

To balance the bonding strength and energy density, the amount of binder contained in active-material layer 33 of negative electrode 1 is preferred to be 1 to 30 parts by weight, more preferably 2 to 15 parts by weight, per 100 parts by weight of the negative-electrode active material.

By setting the ranges as above, conductivity in positive and negative electrodes (2, 1) is secured. Also, binders with such a range can maintain adhesiveness with conductive additives, while providing sufficient adhesiveness with current collectors (22, 32).

A binder is preferred to be dissolved or dispersed in a nonaqueous solvent or water, since it is easier to prepare positive and negative electrodes (2, 1).

A nonaqueous solvent is not limited particularly, and examples are N-methyl-2-pyrrolidone (NMP), dimethylformamide, dimethylacetamide, methyl ethyl ketone, methyl acetate, ethyl acetate, tetrahydrofuran and the like. Dispersants and thickeners may be added to the above examples.

<Current Collectors>

Electrodes (2, 1) are respectively prepared when active-material layers (23, 33) containing active materials are formed on current collectors (22, 32).

To form a high-performance compact battery, active-material layers (23, 23) or (33, 33) forming the same polarity are preferred to be arranged respectively on both surfaces of current collector 22 or 32.

Namely, secondary battery 10 is preferred to have positive-electrode active-material layers (23, 23) respectively formed on both surfaces of current collector 22. Also, secondary battery 10 is preferred to have negative-electrode active-material layers (33, 33) respectively formed on both surfaces of current collector 32.

However, it is an option for secondary battery 10 to have positive-electrode active-material layer 23 only on either surface of current collector 22.

Current collectors (22, 32) collect current from active-material layers (23, 33).

Current collectors (22, 32) are conductive, and take any shape as long as they make the core of each electrode.

For forming current collectors (22, 32), it is preferred to use a sheet- or film-form current-collecting foil, since such a foil is easier to obtain at a reasonable cost.

Materials for current collectors (22, 32) are, for example, those prepared by coating a metal that does not react at the potential of positive electrode 2 or negative electrode 1 (for example, aluminum for positive electrode 2, aluminum or copper for negative electrode 1) on the surface of aluminum, aluminum alloys, and metals other than aluminum (copper, SUS, nickel, titanium and their alloys).

Materials for current collectors (22, 32) are preferred to be aluminum because it is easier to obtain at a reasonable cost.

Especially, considering stability under the reaction atmosphere for a positive electrode, the material of current collector 22 for positive electrode 2 is more preferred to be highly pure aluminum such as those specified in JIS standards (1030, 1050, 1085, 1N90, 1N99) and the like.

The thickness of current collectors (22, 32) is not limited particularly, but is preferred to be 10 μm to 100 μm.

A thickness of less than 10 μm makes handling difficult when forming an electrode, and a thickness of greater than 100 μm lowers cost performance.

<Separators>

Separator 3 is disposed between positive and negative electrodes (2, 1) or between secondary cells (5, 5), and works as an intermediate for lithium ion conduction between them while blocking electron or hole conduction. At least separator 3 is neither electron conductive nor hole conductive.

Separator 3 may contain various plasticizers, antioxidants, flame retardants and the like, and may be coated with metal oxides or the like.

Separator 3 is made of electrically insulative material, thus having electrically insulative properties.

Separator 3 is preferred to be formed by using only a material that has a specific resistance of 108 Ω·cm or higher.

Examples of material for separator 3 are nylon, cellulose, polysulfone, polyethylene, polypropylene, polybutene, polyacrylonitrile, polyimide, polyamide and PET, as well as woven fabrics, nonwoven fabrics, microporous membranes and the like made by combining two or more of the above.

The material for separator 3 is preferred to be at least one type selected from among a cellulose nonwoven fabric, polypropylene, polyethylene, and PET, more preferably polypropylene, polyethylene, and cellulose nonwoven fabric.

In nonaqueous electrolyte secondary battery 10, the area ratio of separator 3 and electrodes (2, 1) is not limited particularly, but is preferred to satisfy formula (3) below.

$$1.0 \leq F/E \leq 1.5 \quad (3)$$

(In the above formula, among surfaces of positive and negative electrodes (2, 1), (E) is the area of an electrode whose separator 3-side surface is greater than the other, and (F) is the area of separator 3.)

Relative to the area of separator 3, when the area of positive electrode 2 or negative electrode 1, which is the greatest among surface areas of electrodes (2, 1), has an area ratio (F/E) of less than 1, positive and negative electrodes (2, 1) disposed to face each other across separator 3 may make contact with each other, causing short circuiting.

An area ratio (F/E) greater than 1.5 increases the volume of an outer package such as casing 8, and a compact battery 10 is not achieved. Thus, output power density per unit size of battery 10 may decrease.

The average thickness of separator 3 is preferred to be 10 μm to 100 μm. An average thickness of less than 10 μm may cause positive and negative electrodes (2, 1) to come into direct contact, while an average thickness of greater than 100 μm may increase the internal resistance of battery 10.

The average thickness of separator 3 is more preferred to be 15 μm to 50 μm, considering cost performance and ease of handling.

<Nonaqueous Electrolyte>

Nonaqueous electrolyte 6 is not limited to any specific amount in casing 8 of secondary battery 10.

The amount of nonaqueous electrolyte 6 in casing 8 is preferred to be at least 0.1 mL per battery capacitance of 1 Ah. Such an amount sufficiently secures the conduction of lithium ions derived from electrode reactions, and desired battery performance is thereby expressed.

Nonaqueous electrolyte 6 may be impregnated in advance into positive electrode 2, negative electrode 1 and separator 3. It is also an option to add nonaqueous electrolyte 6 after compressing or stacking a structure where separator 3 is disposed between positive and negative electrodes (2, 1).

Nonaqueous electrolyte 6 is not limited to any specific type; examples are an electrolyte prepared by dissolving a solute in a nonaqueous solvent, a gel electrolyte prepared by impregnating a polymer with an electrolyte, where the electrolyte is made by dissolving a solute in a nonaqueous solvent, and the like.

Also, nonaqueous electrolyte 6 of the present embodiment may contain a trace amount of additives such as a flame retardant and stabilizer.

As the nonaqueous solvent, an aprotic solvent is preferred, since the solvent is less likely to decompose under an action potential in nonaqueous electrolyte secondary battery 10. It is more preferred to be an aprotic solvent containing a polar aprotic solvent.

A nonaqueous solvent is even more preferred to be at least one type of a polar aprotic solvent selected from among cyclic aprotic solvents and chain aprotic solvents.

It is especially preferred for a nonaqueous solvent to contain a cyclic polar aprotic solvent and chain polar aprotic solvent.

Examples of a cyclic polar aprotic solvent are cyclic carbonates, cyclic esters, cyclic sulfones, cyclic ethers and the like.

Examples of a cyclic carbonate are ethylene carbonate, propylene carbonate, fluoroethylene carbonate, butylene carbonate and the like.

Examples of a chain polar aprotic solvent are acetonitrile, chain carbonates, chain carboxylic acid esters, chain ethers and the like.

Examples of chain carbonates are dimethyl carbonate, diethyl carbonate, ethyl methyl carbonate and the like.

More specific examples of a chain carbonate are dimethyl carbonate, ethyl methyl carbonate, diethyl carbonate, dipropyl carbonate, methyl propyl carbonate, ethylene carbonate, fluoroethylene carbonate, propylene carbonate, butylene carbonate, γ-butyrolactone, 1,2-dimethoxyethane, sulfolane, dioxolane, methyl propionate and the like.

The nonaqueous solvent for nonaqueous electrolyte 6 may be prepared with one of the above or may be a mixture thereof.

Moreover, a nonaqueous solvent is preferred to contain two or more of the solvents listed above. A solute as the later-described supporting salt dissolves better in such a solvent. Also, lithium ion conductivity is enhanced.

The solute of nonaqueous electrolyte 6 is not limited specifically. Preferred examples are $LiClO_4$, $LiBF_4$, $LiPF_6$, $LiAsF_6$, $LiCF_3SO_3$, LiBOB (lithium bis(oxalate)borate), $LiN(SO_2CF_3)_2$, and the like, because they are easier to dissolve in the aforementioned nonaqueous solvents. Among them, $LiPF_6$ is more preferred.

The concentration of a solute in nonaqueous electrolyte 6 is preferred to be 0.5 mol/L to 2.0 mol/L.

Desired lithium-ion conductivity may not be expressed in a concentration of lower than 0.5 mol/L, while in a concentration of higher than 2.0 mol/L, an excess amount of the solute may not dissolve.

In the above embodiment, as shown in FIG. 3, the battery is structured to have electrode-forming members (15, 15) which are in contact with each other, and one of which makes contact with positive-electrode terminal 72 so that the battery is connectible with an external device. However, the present invention is not limited to such a structure. For example, electrode-forming members (15, 15) may be set not to be in contact with each other, but to be electrically connected by positive-electrode terminal 72 as shown in FIG. 1. In such a structure, it is an option for electrode-forming members (15, 15) to be connected through positive-electrode terminal 72 either inside or outside casing 8.

Also, in the above embodiment, the battery is structured to have electrode-forming members (16, 16) in contact with each other, one of which makes contact with negative-electrode terminal 71 so that the battery is connectible with an external device. However, the present invention is not limited to such a structure. For example, electrode-forming members (16, 16) may be set not to be in contact with each other, but to be electrically connected by negative-electrode terminal 71, as shown in FIG. 1. In such a structure, it is an option for electrode-forming members (16, 16) to be connected through negative-electrode terminal 71 either inside or outside casing 8.

In the above embodiment, positive-electrode terminal 72 of positive-electrode member 20 and negative-electrode terminal 71 of negative-electrode member 21 are set to protrude from within casing 8 in opposite directions from each other. However, the present invention is not limited to such a structure, and positive-electrode terminal 72 of positive-electrode member 20 and negative-electrode terminal 71 of negative-electrode member 21 may protrude from within casing 8 in any direction, for example, in the same direction.

In the above embodiment, a laminate-type lithium-ion secondary battery is described. However, the present invention is not limited to such a type, and applies to any other lithium-ion secondary batteries, for example, rectangular or coin-shaped batteries, button cells and the like.

EXAMPLES

The present invention is described in further detail by referring to examples. However, the present invention is not limited to those examples, and may be modified appropriately without departing from the scope of the present invention. Secondary batteries in Examples and Comparative Examples are evaluated by the following methods.

(Method for Charge/Discharge Cycle Test)

Under conditions specified below, a charge/discharge test started with charging a battery, then discharging and charging were repeated under charge conditions 1 and discharge conditions 1, and the test was completed by discharging the battery. Each of the voltages below is not based on a lithium-metal reference electrode but is the voltage of a nonaqueous electrolyte secondary battery.

Conditions for Cycle Test

Temperature of battery ambience: 60° C.

Unit cycle: charge/discharge once per cycle

Number of repeated cycles: 400

Charge/Discharge Conditions

Charge condition 1: charge at a constant current of 0.5 C until the voltage reaches 2.7 V, continue charging at a constant voltage by maintaining 2.7 V, and complete charging when the current reaches 0.02 C.

Discharge condition 1: discharge at a constant current of 1.0 C until the voltage is lowered to 2.0 V, and complete discharging when the voltage reaches 2.0 V.

Regarding "C" above, the value of current required to fully charge or discharge a nonaqueous electrolyte secondary battery in an hour is defined as 1 C. For example, if it is 0.02 C, the value is 0.02 times the current required for a full charge. Also, if the current is 0.5 C, it is ½ C and means the value of current required to fully charge or discharge the nonaqueous electrolyte secondary battery in two hours.

(Method for Determining Capacity Retention Rate and Amount of Gas Formation)

A capacity retention rate means a percentage of the discharge capacity after the completion of charge/discharge cycle testing conducted under the conditions above relative to the discharge capacity of the first cycle.

The method for measuring the amount of gas formation: in an aluminum laminate sheet, which is the external package of the casing of a battery, a gas pocket is formed in advance as part of the volume of the casing so that gas formed during charge/discharge cycles is stored in the gas pocket; and the volume of the battery before and after charge/discharge cycle testing was determined by an Archimedes method.

(Evaluation Criteria of Battery)

When the capacity retention rate was 85% or higher after the completion of charge/discharge cycle testing and when the amount of gas formation per unit volume was 1 mL/Ah or lower, the battery was evaluated as passing.

Next, methods for producing electrodes are described.

First, a positive electrode production method is described.

(Producing Spinel-Type Lithium Manganese Oxide as Positive-Electrode Active Material)

A powder of $Li_{1.1}Al_{0.1}Mn_{1.8}O_4$ (hereinafter also referred to as LAMO) was obtained by applying the method described in a literature (Electrochemical and Solid-State Letters, 9 (12), A557 (2006)) to prepare A~F of $Li_{1.1}Al_{0.1}Mn_{1.8}O_4$ respectively having physical properties shown in Table 1 below.

The "number average particle size" was obtained by observing 100 particles picked at random in the view field of an electron microscope such as an SEM and by calculating their average size.

TABLE 1

| Spinel-type lithium manganese oxide | Number-average particle size (μm) | Specific surface area (m²/g) |
|---|---|---|
| A | 7 | 0.7 |
| B | 11 | 0.4 |
| C | 14 | 0.3 |
| D | 17 | 0.2 |
| E | 21 | 0.1 |
| F | 24 | 0.08 |

(Producing, Lithium Cobalt Oxide as Positive-Electrode Active Material)

A cobalt hydroxide and a lithium hydroxide monohydrate were weighed so that cobalt atoms and lithium atoms had a ratio of 1:1.03. A dry powder of weighed cobalt hydroxide and the lithium hydroxide monohydrate were mixed well, and the mixture was sintered in an 850° C. atmosphere for a predetermined duration to obtain lithium cobalt oxide (hereinafter also referred to as LCO). The lithium cobalt oxide was pulverized, resulting in G~L of lithium cobalt oxide having a number average particle size of 20 μm or smaller and physical properties shown in Table 2 below

TABLE 2

| Lithium cobalt oxide | Number-average particle size (μm) | Specific surface area (m²/g) |
|---|---|---|
| G | 2 | 1 |
| H | 4 | 0.7 |
| I | 4 | 0.6 |
| J | 6 | 0.5 |
| K | 8 | 0.3 |
| L | 13 | 0.1 |

(Forming Positive Electrode)

A slurry was prepared by mixing 100 parts by weight of each of the above powders, 5 parts by weight of a conductive additive (acetylene black) and 5 parts by weight of a binder (NMP solution with a solid concentration of 8 wt. %).

Next, the slurry was coated on an aluminum foil (15 μm) as the current collector to prepare an electrode sheet, which was vacuum dried at 170° C. Then, by punching the electrode sheet into a 4 cm×6 cm piece, positive electrodes 1~17 as shown in Table 3 were each prepared with an active-material layer formed on a current collector.

In Table 3, "lithium manganese oxide:lithium cobalt oxide" indicates the weight ratio of a spinel-type lithium manganese oxide and lithium cobalt oxide as active materials used for each positive electrode.

When coated, both single-sided electrode and double-sided electrode were prepared by coating the slurry on one surface or both surfaces of an aluminum foil as the current collector.

TABLE 3

| Positive electrode | Spinel-type lithium manganese oxide | Lithium cobalt oxide | Lithium manganese oxide: lithium cobalt oxide |
|---|---|---|---|
| 1 | D | J | 100:0 |
| 2 | D | J | 100:1 |
| 3 | D | J | 100:2 |
| 4 | D | J | 100:4 |
| 5 | D | J | 100:7 |
| 6 | D | J | 100:10 |
| 7 | D | G | 100:4 |
| 8 | D | H | 100:4 |
| 9 | D | I | 100:4 |
| 10 | D | J | 100:4 |
| 11 | D | K | 100:4 |
| 12 | D | L | 100:4 |
| 13 | A | J | 100:4 |
| 14 | B | J | 100:4 |
| 15 | C | J | 100:4 |
| 16 | E | J | 100:4 |
| 17 | F | J | 100:4 |

As shown in Table 3, positive electrode 4 and positive electrode 10 are identical.

(Measuring Capacity of Positive Electrodes 1~7)

A half-cell battery was formed by setting each of the positive electrodes above as the working electrode and a lithium electrode as the counter electrode, and a charge/discharge cycle test was conducted as follows to determine the capacity of each positive electrode.

The voltage values below are all referenced to lithium metal.

First, each positive electrode set to be a single-sided electrode was punched to form a 16 mmΦ working electrode, and a lithium metal plate was punched to form a 16 mmΦ counter electrode. Then, the working electrode (the coated surface of the single-sided electrode was placed inside)/separator/counter electrode (lithium metal plate) were stacked in that order in a test cell (HS cell, made by Hohsen Corp.). Then, 0.15 mL of a nonaqueous electrolyte (prepared by using ethylene carbonate:dimethyl carbonate=3:7 (volume ratio) as the solvent, and $LiPF_6$=1 mol/L as a solute) was filled in a test cell to obtain a half cell.

The half cell was left standing at 25° C. for a day, and was connected to a battery charge/discharge system (HJ1005SD8, made by Hokuto Denko Corporation). Constant current charge/discharge cycles were repeated 5 times under conditions of 25° C., 0.4 mA, and the fifth discharge value was set as the capacity of the positive electrode.

During the test, the final voltage for a constant current charge was set at 4.25 V and the final voltage for a constant current discharge was set at 3.0 V. As a result, the capacity per unit area of each of positive electrodes 1~17 was 1.6 to 1.7 mAh/cm².

(Forming Negative Electrode 1)

A powder of lithium titanate, $Li_4Ti_5O_{12}$, was used as the negative-electrode active material for preparing negative electrode 1 by the following method.

Negative Electrode 1: $Li_4Ti_5O_{12}$ (Hereinafter Also Referred to as LTO)

First, a powder of $Li_4Ti_5O_{12}$ was prepared by the method described in a literature (Journal of Electrochemical Society, 142, 1431, (1995)).

Next, 100 parts by weight of the powder was mixed with 5 parts by weight of a conductive additive (acetylene black) and 5 parts by weight of a binder (NMP solution with a solid concentration of 5 wt. %) to obtain a slurry.

Then, the slurry was coated on an aluminum foil (15 μm) for the current collector to form an electrode sheet, which was then vacuum dried at 170° C. After that, by punching the electrode sheet into a size of 4.3 cm×6.3 cm, negative electrode 1 was obtained where an active-material layer was formed on the current collector. Namely, negative electrode 1 was structured to have an active material of $Li_4Ti_5O_{12}$. Both a single-layered and a double-layered electrode were prepared.

(Forming Negative Electrode 2)

A powder of bronze-type titanium dioxide, $TiO_2$ (B), was used as the negative-electrode active material for preparing negative electrode 2 by the following method.

Negative Electrode 2: $TiO_2$ (B)

First, a powder of $TiO_2$ (B) was prepared by the method described in a literature (Journal of Electrochemical Society, 159, A49-A54, (2012)).

Next, using 100 parts by weight of the powder formed above, a slurry was prepared by the same method employed for negative electrode 1. Then, the slurry was coated on an aluminum foil (15 μm) for the current collector to form an electrode sheet, which was then vacuum dried at 170° C. After that, by punching the electrode sheet into a 4.3 cm×6.3 cm piece, negative electrode 2 was obtained where an active-material layer was formed on the current collector. Namely, negative electrode 2 was obtained using bronze-type titanium dioxide ($TiO_2$ (B)) as its active material.

(Forming Negative Electrode 3)

A powder of titanate, $H_2Ti_{12}O_{25}$, was used as the negative-electrode active material for preparing negative electrode 3 by the following method.

Negative Electrode 3: $H_2Ti_{12}O_{25}$ (Hereinafter Also Referred to as HTO)

First, a powder of $H_2Ti_{12}O_{25}$ was prepared by the method described in a literature (Journal of Electrochemical Society, 158, A546-A549, (2011)).

Next, using 100 parts by weight of the powder formed above, a slurry was prepared by the same method employed for negative electrode 1. Then, the slurry was coated on an aluminum foil (15 μm) for the current collector to form an electrode sheet, which was then vacuum dried at 170° C. After that, by punching the electrode sheet into a 4.3 cm×6.3 cm piece, negative electrode 3 was obtained where an active-material layer was formed on the current collector. Namely, negative electrode 3 was obtained using a titanate $H_2Ti_{12}O_{25}$ as the negative-electrode active material.

(Measuring Capacity of Negative Electrodes 1~3)

The capacitance of each negative electrode formed above was determined by the same method employed for positive electrodes 1~17.

For negative electrodes, the final voltage in a constant current charge was set at 2.0 V, and the final voltage in a constant current discharge was set at 1.0 V. As a result, the capacity per unit area of each of negative electrodes 1~3 was 1.8 mAh/cm².

Batteries structured to have double-sided electrodes prepared above were formed in Examples 1~8 and Comparative Examples 1~10 by the method below. Positive and negative electrodes used in each battery are specified in Table 4.

(Forming Battery)

With a cellulose non-woven fabric (25 μm, 30 cm²) disposed between electrodes, 13 positive electrodes and 14 negative electrodes were alternately stacked. Then, the positive electrodes were collectively connected to a positive-electrode terminal while the negative electrodes were collectively connected to a negative-electrode terminal by vibration welding to form their respective electrode groups having terminals.

Next, the electrode groups with terminals attached thereto were placed into a bag made of an aluminum laminate sheet by arranging part of each terminal to extend outside of the aluminum laminate sheet.

Moreover, 5.5 mL of a nonaqueous electrolyte (prepared by using ethylene carbonate:dimethyl carbonate=3:7 (volume ratio) as the nonaqueous solvent, and $LiPF_6$=1 mol/L as a solute for a supporting salt) was filled in the aluminum laminate sheet bag. The opening of the bag was sealed while evacuating the bag, and the electrode laminates were cured for 12 hours. Accordingly, a nonaqueous electrolyte secondary battery was obtained.

For each of the nonaqueous electrolyte secondary batteries in Examples 1~8 and Comparative Examples 1~10, a charge/discharge device was connected between the extended portions of a positive-electrode terminal and a negative-electrode terminal, and the aforementioned charge/discharge cycle test was conducted. Charge and discharge of each battery were repeated to determine the capacity retention rate and amount of gas formation. The results are shown in Table 4. Table 5 collectively shows the results of Tables 1~4.

TABLE 4

|  | Type of positive electrode | Type of negative electrode | Capacity retention rate (%) | Amount of gas formation (mL/Ah) |
|---|---|---|---|---|
| Example 1 | 3 | 1 | 89 | 0.6 |
| Example 2 | 9 | 1 | 88 | 0.7 |
| Example 3 | 10(4) | 1 | 94 | <0.2 |
| Example 4 | 11 | 1 | 91 | 0.9 |
| Example 5 | 14 | 1 | 89 | 0.6 |
| Example 6 | 15 | 1 | 88 | 0.3 |
| Example 7 | 4 | 2 | 95 | <0.2 |
| Example 8 | 4 | 3 | 94 | <0.2 |
| Comp. Example 1 | 1 | 1 | 86 | 5.2 |
| Comp. Example 2 | 2 | 1 | 95 | 1.2 |
| Comp. Example 3 | 5 | 1 | 84 | 3.0 |
| Comp. Example 4 | 6 | 1 | 80 | 5.4 |
| Comp. Example 5 | 7 | 1 | 91 | 2.0 |
| Comp. Example 6 | 8 | 1 | 90 | 1.1 |
| Comp. Example 7 | 12 | 1 | 87 | 1.2 |
| Comp. Example 8 | 13 | 1 | 84 | 1.1 |
| Comp. Example 9 | 16 | 1 | 82 | 0.6 |
| Comp. Example 10 | 17 | 1 | 78 | 0.7 |

TABLE 5

| | Type of positive electrode | | | | | | | |
|---|---|---|---|---|---|---|---|---|
| | LAMO | | LCO | | | | | |
| | Number average particle size (μm) | Specific surface area ($m^2/g$) | Number-average particle size (μm) | Specific surface area ($m^2/g$) | Ratio of LCO per 100 parts by wt. of LAMO (parts by wt.) | Type of negative electrode | Capacity retention rate (%) | Amount of gas formation (mL/Ah) |
| Example 1 | 17 | 0.2 | 6 | 0.5 | 2 | LTO | 89 | 0.6 |
| Example 2 | 17 | 0.2 | 4 | 0.6 | 4 | LTO | 88 | 0.7 |
| Example 3 | 17 | 0.2 | 6 | 0.5 | 4 | LTO | 94 | <0.2 |
| Example 4 | 17 | 0.2 | 8 | 0.3 | 4 | LTO | 91 | 0.9 |
| Example 5 | 11 | 0.4 | 6 | 0.5 | 4 | LTO | 89 | 0.6 |
| Example 6 | 14 | 0.3 | 6 | 0.5 | 4 | LTO | 88 | 0.3 |
| Example 7 | 17 | 0.2 | 6 | 0.5 | 4 | $TiO_2(B)$ | 95 | <0.2 |
| Example 8 | 17 | 0.2 | 6 | 0.5 | 4 | HTO | 94 | <0.2 |
| Comp. Example 1 | 17 | 0.2 | 6 | 0.5 | 0 | LTO | 86 | 5.2 |
| Comp. Example 2 | 17 | 0.2 | 6 | 0.5 | 1 | LTO | 95 | 1.2 |
| Comp. Example 3 | 17 | 0.2 | 6 | 0.5 | 7 | LTO | 84 | 3.0 |
| Comp. Example 4 | 17 | 0.2 | 6 | 0.5 | 10 | LTO | 80 | 5.4 |
| Comp. Example 5 | 17 | 0.2 | 2 | 1 | 4 | LTO | 91 | 2.0 |
| Comp. Example 6 | 17 | 0.2 | 4 | 0.7 | 4 | LTO | 90 | 1.1 |
| Comp. Example 7 | 17 | 0.2 | 13 | 0.1 | 4 | LTO | 87 | 1.2 |
| Comp. Example 8 | 7 | 0.7 | 6 | 0.5 | 4 | LTO | 84 | 1.1 |
| Comp. Example 9 | 21 | 0.1 | 6 | 0.5 | 4 | LTO | 82 | 0.6 |
| Comp. Example 10 | 24 | 0.08 | 6 | 0.5 | 4 | LTO | 78 | 0.7 |

As shown in Tables 4 and 5, batteries of Examples 1~8 were all evaluated as passing, whereas those of Comparative Examples 1~10 all failed. Namely, after the charge/discharge cycle testing, batteries in Examples 1~8 each exhibited a capacity retention rate of 85% or higher and an amount of gas formation per unit volume of 1 mL/Ah or less.

Furthermore, batteries of Examples 3, 7 and 8 are evaluated to be especially excellent among Examples 1~8, since they each exhibited a capacity retention rate at 94% or higher, and a low amount of gas formation at 0.2 mL/Ah or less after the charge/discharge cycle testing.

It is not clear why the batteries of Examples 3, 7 and 8 exhibited excellent cycle characteristics while resulting in a significantly low amount of gas formation. It is assumed that using a spinel-type lithium manganese oxide (LAMO) and layered rock salt structure active material (LCO) having an appropriate number average particle size and specific surface area suppressed materials in positive electrodes from deterioration caused by repeated charge/discharge cycles while gas formed from a titanium compound in negative electrodes is efficiently occluded.

By contrast, the battery of Comparative Example 1 does not contain layered rock salt structure active material (LCO) as a positive-electrode active material that would have an effect of suppressing the formation of gas. Thus, it is thought that gas formation was not suppressed, the gas increased the internal resistance, and the capacity retention rate was thereby lowered.

Similarly, the battery of Comparative Example 2 contains only 1 part by weight of layered rock salt structure active material (LCO) as a positive-electrode active material that would have an effect of suppressing the formation of gas. Accordingly, it is thought that the gas was not sufficiently occluded, causing the formation of gas to be greater than 1 mL/Ah.

Moreover, although batteries of Comparative Examples 3 and 4 each contain a layered rock salt active material (LCO) as a positive-electrode active material that would have an effect of suppressing the formation of gas, the content in each positive-electrode active-material layer is greater—7 parts by weight in Comparative Example 3 and 10 parts by weight in Comparative Example 4. Accordingly, it is thought that repeated charge/discharge cycles increased regions with a disturbed layered structure on particle surfaces of layered rock salt structure active material (LCO) and deterioration of the material such as cracking occurred, causing the regions to become abnormal activity sites.

As a result, it is thought that gas formation increased, internal resistance rose, and the capacity retention rate was lowered in Comparative Examples 3 and 4.

Considering the results and measurement error margins in Examples 1, 3 and Comparative Examples 1~4, to stabilize cycle characteristics and suppress gas formation, it is thought to be most preferable to mix 2 to 5 parts by weight of a layered rock-salt active material (LCO) per 100 parts by weight of a spinel-type lithium manganese oxide.

As positive-electrode active materials that contribute to suppressing gas formation, batteries of Comparative Examples 5~7 each contain an appropriate amount, 2 to 5 parts by weight, of a layered rock salt structure active material (LCO) relative to a spinel-type lithium manganese oxide (LAMO).

However, a greater amount of gas formation was observed in the batteries of Comparative Examples 5, 6. Reasons for such gas formation are thought to be as follows: since a layered rock salt structure active material (LCO) has fine particles and the specific surface area value is higher, repeated charge/discharge cycles increased regions with a disturbed layer structure on particle surfaces of layered rock salt structure active material (LCO), resulting in deterioration of the material such as cracking; the deteriorated portions become abnormal activity sites and the electrolyte is decomposed at the sites, causing formation of gas, which is different from the gas to be occluded by the layered rock salt structure active material (LCO); and a greater amount of gas formation results accordingly.

Meanwhile, a greater amount of gas formation was also observed in the battery of Comparative Example 7. That is thought to be because the gas occlusion capability is low in the layered rock salt active material (LCO) due to its greater particle size and a lower specific surface area.

Considering the results in Examples 2~4 and Comparative Examples 5~7, to stabilize cycle characteristics and suppress gas formation, it is thought to be most preferable for a layered rock salt structure active material (LCO) to have a number average particle size of 3 to 9 µm and a specific surface area of 0.3 to 0.6 m²/g.

As positive-electrode active materials which contribute to reducing formation of gas, batteries of Comparative Examples 8~10 each contain an appropriate amount, 2 to 5 parts by weight, of a layered rock salt structure active material (LCO) relative to the weight of a spinel-type lithium manganese oxide (LAMO). Moreover, for batteries of Comparative Examples 8~10, particles of a layered rock salt structure active material (LCO) are each set to have a number-average particle size of 3 to 9 µm and a specific surface area of 0.3 to 0.6 m²/g.

Despite such settings, the battery of Comparative Example 8 formed a greater amount of gas and its capacity retention rate was low.

The exact reasons for the above results are not clear, but it is thought that the spinel-type lithium manganese oxide deteriorated in charge/discharge cycles due to its smaller number average particle size and greater specific surface area, and formed gas different from the gas to be occluded by the layered rock salt structure active material.

Meanwhile, batteries of Comparative Examples 9, 10 each showed less gas formation but the capacitance retention rate was lower.

That is thought to be because due to its greater number average particle size and smaller specific surface area, the spinel-type lithium manganese oxide had lower power characteristics, thereby resulting in a lower capacitance retention rate.

Considering the results in Examples 5, 6 and Comparative Examples 8~10, to stabilize cycle characteristics and suppress gas formation, it is thought to be most preferable for particles of a spinel-type lithium manganese oxide (LAMO) to have a number average particle size of 10 to 20 µm and a specific surface area of 0.05 to 0.4 m²/g.

From the results shown above, it is found that when conditions (1)~(3) below are all satisfied, the obtained secondary battery exhibits high performance, that is, its capacity retention rate is 85% or higher and a gas formation amount per unit volume is 1 mL/Ah or lower after charge/discharge cycle testing.

(1) a layered rock salt structure active compound is contained at 2 to 5 parts by weight per 100 parts by weight of a spinel-type lithium manganese oxide;
(2) the spinel-type lithium manganese oxide has a number average particle size of 10 to 20 µm and a specific surface area of 0.05 to 0.4 m²/g; and
(3) the layered rock salt structure compound has a number average particle size of 3 to 9 µm and a specific surface area of 0.3 to 0.6 m²/g.

DESCRIPTION OF NUMERICAL REFERENCES 1 negative electrode
2 positive electrode
3 separator
6 nonaqueous electrolyte
8 casing
10 nonaqueous electrolyte secondary battery

What is claimed is:

1. A secondary battery, comprising:
at least one secondary cell having a positive electrode and a negative electrode facing the positive electrode across a separator which is electrically insulative; and
a nonaqueous electrolyte present on the positive electrode, the negative electrode, and the separator,
wherein the negative electrode includes at least one active-material layer comprising a titanium compound,
the positive electrode includes at least one active-material layer comprising a spinel-type lithium manganese oxide and a layered rock-salt compound,
the spinel-type lithium manganese oxide has a number-average particle size of 10 µm to 20 µm and a specific surface area of 0.05 m²/g to 0.4 m²/g, and
the layered rock-salt compound has a number-average particle size of 3 µm to 9 µm and a specific surface area of 0.3 m²/g to 0.6 m²/g, and is included in an amount of 2 to 5 parts by weight per 100 parts by weight of the spinel-type lithium manganese oxide.

2. The secondary battery of claim 1, wherein the spinel-type lithium manganese oxide comprises at least one compound represented by $Li_{1+x}Al_yMn_{2-x-y}O_4$ where $0 \leq x \leq 0.1$, $0 < y \leq 0.1$ or $Li_{1+x}Mg_yMn_{2-x-y}O_4$ where $0 \leq x \leq 0.1$, $0 < y \leq 0.1$.

3. The secondary battery of claim 1, wherein the positive and the negative electrodes have a capacitance ratio B/A satisfying formula (1), $$0.8 \leq B/A \leq 1.3 \tag{1},$$

where A is a capacitance per unit area of the positive electrode, and B is a capacitance per unit area of the negative electrode.

4. The secondary battery of claim 2, wherein the positive and the negative electrodes have a capacitance ratio B/A satisfying formula (1), $$0.8 \leq B/A \leq 1.3 \tag{1},$$

where A is a capacitance per unit area of the positive electrode, and B is a capacitance per unit area of the negative electrode.

5. The secondary battery of claim 3, wherein the capacitance ratio B/A is 1.0 to 1.3.

6. The secondary battery of claim 4, wherein the capacitance ratio B/A is 1.0 to 1.3.

7. The secondary battery of claim 1, wherein the positive and negative electrodes each have the active-material layer spread in a planar shape and have an area ratio D/C satisfying formula (2), $$0.8 \leq D/C \leq 1.2 \tag{2}$$

where C is a separator-side surface area of the active-material layer of the positive electrode, and D is a separator-side surface area of the active-material layer of the negative electrode.

8. The secondary battery of claim 2, wherein the positive and negative electrodes each have the active-material layer spread in a planar shape and have an area ratio D/C satisfying formula (2), $$0.8 \leq D/C \leq 1.2 \tag{2}$$

where C is a separator-side surface area of the active-material layer of the positive electrode, and D is a separator-side surface area of the active-material layer of the negative electrode.

9. The secondary battery of claim 3, wherein the positive and negative electrodes each have the active-material layer spread in a planar shape and have an area ratio D/C satisfying formula (2), $$0.8 \leq D/C \leq 1.2 \qquad (2)$$

where C is a separator-side surface area of the active-material layer of the positive electrode, and D is a separator-side surface area of the active-material layer of the negative electrode.

10. The secondary battery of claim 7, wherein the area ratio D/C is 1.0 to 1.2.

11. The secondary battery of claim 8, wherein the area ratio D/C is 1.0 to 1.2.

12. The secondary battery of claim 9, wherein the area ratio D/C is 1.0 to 1.2.

13. The secondary battery of claim 1, wherein the titanium compound comprises at least one selected from the group consisting of $Li_4Ti_5O_{12}$, $H_2Ti_{12}O_{25}$, and $TiO_2(B)$.

14. The secondary battery of claim 1, wherein the layered rock-salt compound comprises at least one selected from the group consisting of lithium cobalt oxide, lithium nickel cobalt aluminum oxide, and lithium nickel cobalt manganese oxide.

15. The secondary battery of claim 1, wherein the layered rock-salt compound has a number-average particle size of 5 μm to 7 μm and a specific surface area of 0.4 m$^2$/g to 0.5 m$^2$/g.

16. The secondary battery of claim 14, wherein the layered rock-salt compound has a number-average particle size of 5 μm to 7 μm and a specific surface area of 0.4 m$^2$/g to 0.5 m$^2$/g.

17. The secondary battery of claim 1, wherein the at least one secondary cell comprises a plurality of secondary cells having adjacent secondary cells electrically connected in parallel.

18. A secondary battery, comprising:
a positive electrode;
a negative electrode facing the positive electrode across a separator which is electrically insulative; and
a nonaqueous electrolyte,
wherein the negative electrode includes an active material comprising at least one titanium compound selected from the group consisting of $Li_4Ti_5O_{12}$, $H_2Ti_{12}O_{25}$, and $TiO_2(B)$,
the positive electrode includes an active material comprising a spinel-type lithium manganese oxide and a layered rock-salt compound,
the spinel-type lithium manganese oxide comprises at least one compound represented by $Li_{1+x}Al_yMn_{2-x-y}O_4$ where $0 \leq x \leq 0.1$, $0 \leq y \leq 0.1$ or $Li_{1+x}Mg_yMn_{2-x-y}O_4$ where $0 \leq x \leq 0.1$, $0 \leq y \leq 0.1$, and has a number-average particle size of 10 μm to 20 μm and a specific surface area of 0.05 m$^2$/g to 0.4 m$^2$/g,
the layered rock-salt compound comprises at least one selected from the group consisting of lithium cobalt oxide, lithium nickel cobalt aluminum oxide, and lithium nickel cobalt manganese oxide, and has a number-average particle size of 3 μm to 9 μm and a specific surface area of 0.3 m$^2$/g to 0.6 m$^2$/g, and
the layered rock-salt compound is included in an amount of 2 to 5 parts by weight per 100 parts by weight of the spinel-type lithium manganese oxide.

19. A positive electrode, comprising:
a spinel-type lithium manganese oxide; and
an active material comprising a layered rock-salt compound,
wherein the spinel-type lithium manganese oxide has a number-average particle size of 10 μm to 20 μm and a specific surface area of 0.05 m$^2$/g to 0.4 m$^2$/g,
the layered rock-salt compound has a number-average particle size of 3 μm to 9 μm and a specific surface area of 0.3 m$^2$/g to 0.6 m$^2$/g, and
the layered rock-salt compound is included in an amount of from 2 to 5 parts by weight per 100 parts by weight of the spinel-type lithium manganese oxide.

20. A secondary battery, comprising:
the positive electrode of claim 19;
a negative electrode facing the positive electrode across a separator which is electrically insulative; and
a nonaqueous electrolyte present on the positive electrode, the negative electrode, and the separator.

* * * * *

UNITED STATES PATENT AND TRADEMARK OFFICE
CERTIFICATE OF CORRECTION

PATENT NO. : 10,651,468 B2
APPLICATION NO. : 15/550119
DATED : May 12, 2020
INVENTOR(S) : Ayumi Takaoka et al.

It is certified that error appears in the above-identified patent and that said Letters Patent is hereby corrected as shown below:

On the Title Page

Item (72), the Inventor's address is incorrect. Item (72) should read:
-- (72) Ayumi Takaoka, Settsu-shi (JP); Masato Kuratsu, Settsu-shi (JP) --

Signed and Sealed this
Twenty-ninth Day of September, 2020

Andrei Iancu
*Director of the United States Patent and Trademark Office*